(12) United States Patent 
Preheim et al.

(10) Patent No.: US 12,568,948 B2 
(45) Date of Patent: *Mar. 10, 2026

(54) NOZZLE CONTROL SYSTEM AND METHOD

(71) Applicant: Raven Industries, Inc., Sioux Falls, SD (US)

(72) Inventors: John D. Preheim, Beresford, SD (US); Brent A. Driesen, Alvord, IA (US); Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,983

(22) Filed: May 21, 2024

(65) Prior Publication Data

US 2024/0324580 A1 Oct. 3, 2024

Related U.S. Application Data

(63) Continuation of application No. 17/410,852, filed on Aug. 24, 2021, now Pat. No. 12,029,214, which is a (Continued)

(51) Int. Cl. 
*A01M 7/00* (2006.01) 
*B05B 12/08* (2006.01)

(52) U.S. Cl. 
CPC ............ *A01M 7/0089* (2013.01); *B05B 12/08* (2013.01)

(58) Field of Classification Search 
CPC ....... A01M 7/0089; A01M 7/00; B05B 12/08; B05B 12/00 
See application file for complete search history.

(56) References Cited

U.S. PATENT DOCUMENTS

| | | | |
|---|---|---|---|
| 1,582,986 A | 5/1926 | Frank | |
| 1,947,407 A | 2/1934 | Cornell, Jr. | |

(Continued)

FOREIGN PATENT DOCUMENTS

| | | |
|---|---|---|
| AU | 725448 | 10/2000 |
| AU | 2004219715 | 9/2004 |

(Continued)

OTHER PUBLICATIONS

"Agrifac Pulse-width modulation (PWM) spraying", 2021 Agrifac Machinery B.V. [online], [archived Jan. 16, 2021]. Retrieved from the Internet: <URL: https://web.archive.org/web/20210116150413/https://www.agrifac.com/optional-spray-technology/strictspray-plus/>, (Jan. 16, 2021), 15 pgs.

(Continued)

*Primary Examiner* — Christopher J. Novosad 
(74) *Attorney, Agent, or Firm* — Schwegman Lundberg & Woessner, P.A.

(57) ABSTRACT

Systems and methods may be used to perform nozzle control. For example, a system includes an overall system pressure valve, configured to adjust the pressure of an agricultural product within a boom. A master node is configured to receive an overall system flow rate measurement, an overall target flow rate, and an overall system pressure measurement. The master node is configured to adjust the overall system pressure valve to control the pressure of the agricultural product. A plurality of smart nozzles are configured to dispense the agricultural product, the plurality of smart nozzles each associated with an electronic control unit (ECU) and one or more individual nozzle. The smart nozzle is configured to control a nozzle flow rate of the associated one or more individual nozzles.

24 Claims, 6 Drawing Sheets

Related U.S. Application Data continuation of application No. 16/447,779, filed on Jun. 20, 2019, now Pat. No. 11,134,668, which is a continuation of application No. 15/703,818, filed on Sep. 13, 2017, now Pat. No. 10,368,538, which is a continuation of application No. 15/029,935, filed as application No. PCT/US2014/061150 on Oct. 17, 2014, now Pat. No. 9,781,916.

(60) Provisional application No. 61/892,339, filed on Oct. 17, 2013.

(56) References Cited

U.S. PATENT DOCUMENTS

| | | | |
|---|---|---|---|
| 3,197,299 A | 7/1965 | Bosse et al. |
| 3,770,198 A | 11/1973 | Mihara |
| 3,955,795 A | 5/1976 | Neely |
| 4,283,010 A | 8/1981 | Arzi et al. |
| 4,356,528 A | 10/1982 | Coffee |
| 4,392,611 A | 7/1983 | Bachman et al. |
| 4,398,605 A | 8/1983 | Conklin et al. |
| 4,530,463 A | 7/1985 | Hiniker et al. |
| 4,582,085 A | 4/1986 | Hafner et al. |
| 4,632,358 A | 12/1986 | Orth et al. |
| 4,803,626 A | 2/1989 | Bachman et al. |
| 4,970,973 A | 11/1990 | Lyle et al. |
| 5,134,961 A | 8/1992 | Giles et al. |
| 5,285,814 A | 2/1994 | Pettersson et al. |
| 5,310,113 A | 5/1994 | Cowgur |
| 5,337,959 A | 8/1994 | Boyd |
| 5,475,614 A | 12/1995 | Tofte et al. |
| 5,479,812 A | 1/1996 | Juntunen et al. |
| 5,496,100 A | 3/1996 | Schmid |
| 5,503,366 A | 4/1996 | Zabeck et al. |
| 5,520,333 A | 5/1996 | Tofte |
| 5,615,836 A | 4/1997 | Graef |
| 5,635,911 A | 6/1997 | Landers et al. |
| 5,649,687 A | 7/1997 | Rosas et al. |
| 5,653,389 A | 8/1997 | Henderson et al. |
| 5,703,554 A | 12/1997 | Polgar et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood et al. |
| 5,864,781 A | 1/1999 | White |
| 5,881,919 A | 3/1999 | Womac et al. |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,924,371 A | 7/1999 | Flamme et al. |
| 5,931,882 A | 8/1999 | Fick et al. |
| 5,936,234 A | 8/1999 | Thomas et al. |
| 5,938,071 A | 8/1999 | Sauder |
| 5,941,303 A | 8/1999 | Gowan et al. |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,012,996 A | 1/2000 | Lo |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,089,743 A | 7/2000 | Mcquinn et al. |
| 6,093,926 A | 7/2000 | Mertins et al. |
| 6,112,999 A | 9/2000 | Fingleton et al. |
| 6,122,581 A | 9/2000 | McQuinn |
| 6,145,455 A | 11/2000 | Gust et al. |
| 6,149,071 A | 11/2000 | Maccallummhor et al. |
| 6,189,466 B1 | 2/2001 | Sinclair et al. |
| 6,189,807 B1 | 2/2001 | Miller et al. |
| 6,196,473 B1 | 3/2001 | Beeren et al. |
| 6,199,000 B1 | 3/2001 | Keller et al. |
| 6,209,563 B1 | 4/2001 | Seid et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,269,757 B1 | 8/2001 | Kiest |
| 6,285,938 B1 | 9/2001 | Lang et al. |
| 6,305,583 B1 | 10/2001 | Ward et al. |
| 6,373,057 B1 | 4/2002 | Penfold |
| 6,486,761 B1 | 11/2002 | Czarnetzki et al. |
| 6,522,948 B1 | 2/2003 | Benneweis |
| 6,533,334 B1 | 3/2003 | Bonn |
| 6,584,920 B1 | 7/2003 | Cresswell |
| 6,598,944 B1 | 7/2003 | Wolff et al. |
| 6,606,542 B2 | 8/2003 | Hauwiller et al. |
| 6,661,514 B1 | 12/2003 | Tevs et al. |
| 6,666,384 B2 | 12/2003 | Prandi |
| 6,678,580 B2 | 1/2004 | Benneweis |
| 6,698,368 B2 | 3/2004 | Cresswell |
| 6,708,080 B2 | 3/2004 | Benneweis |
| 6,720,684 B2 | 4/2004 | Czimmek |
| 6,755,390 B2 | 6/2004 | Masuda et al. |
| 6,776,355 B2 | 8/2004 | Ringer et al. |
| 6,851,377 B2 | 2/2005 | Mayerle et al. |
| 6,853,276 B2 | 2/2005 | Smith |
| 6,877,675 B2 | 4/2005 | Benneweis |
| 6,877,717 B2 | 4/2005 | Collins et al. |
| 6,959,907 B2 | 11/2005 | Hironaka |
| 6,994,406 B1 | 2/2006 | Krawczyk et al. |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,195,027 B2 | 3/2007 | Goossens et al. |
| 7,243,899 B2 | 7/2007 | Acar et al. |
| 7,311,004 B2 | 12/2007 | Giles |
| 7,347,221 B2 | 3/2008 | Berger et al. |
| 7,395,769 B2 | 7/2008 | Jensen |
| 7,441,746 B2 | 10/2008 | Sugiyama |
| 7,472,660 B2 | 1/2009 | Mariman et al. |
| 7,478,603 B2 | 1/2009 | Riewerts et al. |
| 7,490,564 B2 | 2/2009 | Allan et al. |
| 7,502,665 B2 | 3/2009 | Giles et al. |
| 7,626,288 B2 | 12/2009 | Protze |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,845,914 B2 | 12/2010 | Engelbrecht et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,109,448 B2 | 2/2012 | Giles |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,214,111 B2 | 7/2012 | Heiniger et al. |
| 8,246,004 B2 | 8/2012 | Kratzer |
| 8,401,704 B2 | 3/2013 | Pollock et al. |
| 8,488,874 B2 | 7/2013 | Zaman et al. |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |

(56) References Cited

U.S. PATENT DOCUMENTS

| | | |
|---|---|---|
| 8,701,707 B2 | 4/2014 | Moosmann et al. |
| 8,733,257 B2 | 5/2014 | Beaujot et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |
| 9,266,124 B2 | 2/2016 | Humpal |
| 9,453,585 B2 | 9/2016 | Sato et al. |
| 9,470,332 B2 | 10/2016 | Miura |
| 9,504,212 B2 | 11/2016 | Michael et al. |
| 9,506,578 B2 | 11/2016 | Lee |
| 9,635,848 B2 | 5/2017 | Needham et al. |
| 9,702,475 B2 | 7/2017 | Scheffel et al. |
| 9,781,916 B2 | 10/2017 | Preheim et al. |
| 9,894,829 B2 | 2/2018 | Shivak |
| 10,058,879 B2 | 8/2018 | Needham |
| 10,173,236 B2 | 1/2019 | Preheim et al. |
| 10,189,031 B2 | 1/2019 | Funseth et al. |
| 10,368,538 B2 | 8/2019 | Preheim et al. |
| 10,518,284 B2 | 12/2019 | Thurow et al. |
| 10,568,257 B2 | 2/2020 | Shivak |
| 10,799,898 B2 | 10/2020 | Posselius et al. |
| 10,821,460 B2 | 11/2020 | Batcheller et al. |
| 11,051,505 B2 | 7/2021 | Humpal et al. |
| 11,071,247 B2 | 7/2021 | Shivak et al. |
| 11,134,668 B2 | 10/2021 | Preheim et al. |
| 11,160,204 B2 | 11/2021 | Michael |
| 11,236,841 B2 | 2/2022 | Krosschell et al. |
| 11,612,160 B2 | 3/2023 | Krosschell et al. |
| 11,744,239 B2 | 9/2023 | Kocer et al. |
| 11,944,046 B2 | 4/2024 | Wonderlich et al. |
| 12,016,326 B2 | 6/2024 | Kocer et al. |
| 12,029,214 B2 | 7/2024 | Preheim et al. |
| 12,055,234 B2 | 8/2024 | Krosschell et al. |
| 12,389,899 B2 | 8/2025 | Kocer et al. |
| 2002/0030119 A1 | 3/2002 | Proharam |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2003/0234301 A1 | 12/2003 | Swan |
| 2004/0036048 A1 | 2/2004 | Petersen |
| 2004/0104370 A1 | 6/2004 | Suzuki |
| 2004/0128045 A1 | 7/2004 | Benneweis |
| 2005/0000277 A1 | 1/2005 | Giles |
| 2005/0048196 A1 | 3/2005 | Yanagita et al. |
| 2005/0051749 A1 | 3/2005 | Lee |
| 2005/0076818 A1 | 4/2005 | Grimm |
| 2005/0092951 A1 | 5/2005 | Groetzinger |
| 2005/0125083 A1 | 6/2005 | Kiko |
| 2005/0173979 A1 | 8/2005 | Voss |
| 2006/0086295 A1 | 4/2006 | Jensen |
| 2006/0097210 A1 | 5/2006 | Fong et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0039880 A1 | 2/2007 | Mayerle |
| 2007/0128372 A1 | 6/2007 | Wirth et al. |
| 2008/0110476 A1 | 5/2008 | Amestoy et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2008/0230624 A1 | 9/2008 | Giles et al. |
| 2008/0283633 A1 | 11/2008 | Nozaki et al. |
| 2008/0296398 A1 | 12/2008 | Hickman et al. |
| 2009/0078178 A1 | 3/2009 | Beaujot |
| 2009/0101371 A1 | 4/2009 | Melanson et al. |
| 2009/0112372 A1 | 4/2009 | Peterson |
| 2009/0114210 A1 | 5/2009 | Guice et al. |
| 2009/0134237 A1 | 5/2009 | Giles |
| 2009/0184182 A1 | 7/2009 | Beeren |
| 2009/0271136 A1 | 10/2009 | Beaujot et al. |
| 2010/0032492 A1 | 2/2010 | Grimm et al. |
| 2010/0096476 A1 | 4/2010 | Callies et al. |
| 2010/0101469 A1 | 4/2010 | Landphair et al. |
| 2010/0132600 A1 | 6/2010 | Dean et al. |
| 2010/0163774 A1 | 7/2010 | Rimboym et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2011/0210186 A1 | 9/2011 | Kugler et al. |
| 2012/0045013 A1 | 2/2012 | Chen et al. |
| 2012/0080624 A1 | 4/2012 | Stahr et al. |
| 2012/0153051 A1 | 6/2012 | Kah, Jr. et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0292590 A1 | 11/2013 | Stahr |
| 2013/0306894 A1 | 11/2013 | Weis et al. |
| 2013/0320105 A1 | 12/2013 | Schmidt |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0048002 A1 | 2/2014 | Grimm et al. |
| 2014/0084196 A1 | 3/2014 | Heyer et al. |
| 2014/0091243 A1 | 4/2014 | Leidig |
| 2014/0216315 A1 | 8/2014 | Beaujot et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0312141 A1 | 10/2014 | Ravishankar |
| 2014/0333398 A1 | 11/2014 | Nila et al. |
| 2014/0361094 A1 | 12/2014 | Michael |
| 2015/0115058 A1 | 4/2015 | Wilger |
| 2015/0257331 A1 | 9/2015 | Shivak |
| 2015/0336116 A1 | 11/2015 | Gerdes |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |
| 2016/0044862 A1 | 2/2016 | Kocer et al. |
| 2016/0084382 A1 | 3/2016 | Pisasale |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2016/0251008 A1 | 9/2016 | Jeon et al. |
| 2017/0018345 A1 | 1/2017 | Raff et al. |
| 2017/0050206 A1 | 2/2017 | Bullock et al. |
| 2017/0079200 A1 | 3/2017 | Posselius et al. |
| 2017/0120263 A1 | 5/2017 | Needham |
| 2017/0251656 A1 | 9/2017 | Kolb et al. |
| 2017/0284285 A1 | 10/2017 | Lenk et al. |
| 2017/0314580 A1 | 11/2017 | Steensma et al. |
| 2017/0348718 A1 | 12/2017 | Preheim et al. |

(56) References Cited

U.S. PATENT DOCUMENTS

| | | |
|---|---|---|
| 2018/0042214 A1 | 2/2018 | Preheim et al. |
| 2018/0111148 A1 | 4/2018 | Batcheller et al. |
| 2018/0288934 A1 | 10/2018 | Shivak |
| 2019/0029170 A1 | 1/2019 | Wilger |
| 2019/0040972 A1 | 2/2019 | Schrader |
| 2019/0047694 A1 | 2/2019 | Zivan et al. |
| 2019/0321844 A1 | 10/2019 | Schrader et al. |
| 2019/0350187 A1 | 11/2019 | Kocer et al. |
| 2019/0373880 A1 | 12/2019 | Kocer et al. |
| 2020/0037519 A1 | 2/2020 | Wonderlich et al. |
| 2020/0101480 A1 | 4/2020 | Schrader et al. |
| 2020/0107538 A1 | 4/2020 | Preheim et al. |
| 2020/0113170 A1 | 4/2020 | Davis et al. |
| 2020/0113171 A1 | 4/2020 | Davis et al. |
| 2020/0214193 A1 | 7/2020 | Shivak |
| 2020/0253111 A1 | 8/2020 | Schlipf et al. |
| 2020/0406281 A1 | 12/2020 | Funseth et al. |
| 2021/0000006 A1 | 1/2021 | Ellaboudy et al. |
| 2021/0016309 A1 | 1/2021 | Bremer et al. |
| 2021/0076977 A1 | 3/2021 | Abeyratne et al. |
| 2021/0102637 A1 | 4/2021 | Krosschell et al. |
| 2021/0144906 A1 | 5/2021 | Shivak et al. |
| 2021/0176977 A1 | 6/2021 | Bremer et al. |
| 2021/0219538 A1 | 7/2021 | Krosschell et al. |
| 2021/0282315 A1 | 9/2021 | Charcosset |
| 2021/0289693 A1 | 9/2021 | Harmon et al. |
| 2021/0400946 A1 | 12/2021 | Burgers et al. |
| 2022/0079132 A1 | 3/2022 | Preheim et al. |
| 2022/0088627 A1 | 3/2022 | Chaim et al. |
| 2022/0099213 A1 | 3/2022 | Krosschell et al. |
| 2022/0104427 A1 | 4/2022 | Michael |
| 2022/0124962 A1 | 4/2022 | Long et al. |
| 2023/0049963 A1 | 2/2023 | Kocer et al. |
| 2023/0141050 A1 | 5/2023 | Sibley et al. |
| 2023/0141867 A1 | 5/2023 | Krosschell et al. |
| 2023/0329220 A1 | 10/2023 | Krosschell et al. |
| 2023/0356248 A1 | 11/2023 | Krosschell et al. |
| 2024/0130347 A1 | 4/2024 | Kocer et al. |
| 2024/0418289 A1 | 12/2024 | Krosschell et al. |

FOREIGN PATENT DOCUMENTS

| | | |
|---|---|---|
| AU | 2005247004 | 12/2006 |
| AU | 2006202376 B2 | 12/2006 |
| AU | 2009203181 A1 | 2/2010 |
| AU | 2012201357 A1 | 9/2012 |
| AU | 2013203361 A1 | 10/2013 |
| AU | 2013204455 A1 | 3/2014 |
| AU | 2013248190 | 5/2014 |
| AU | 2013277513 B2 | 3/2017 |
| AU | 2015204319 B2 | 4/2019 |
| AU | 2017285727 B2 | 7/2020 |
| AU | 2020357581 A1 | 5/2022 |
| AU | 2020357581 B2 | 8/2023 |
| AU | 2021209314 B2 | 8/2023 |
| AU | 2023214344 A1 | 8/2023 |
| AU | 2021439481 B2 | 7/2025 |
| AU | 2023258379 B2 | 7/2025 |
| BR | 112022026505 A2 | 5/2023 |
| CA | 2229852 A1 | 8/1998 |
| CA | 2517031 A1 | 9/2004 |
| CA | 2528708 A1 | 11/2006 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CA | 2830306 | 4/2014 |
| CA | 2926448 A1 | 4/2015 |
| CA | 2926448 C | 9/2020 |
| CA | 3049421 C | 3/2023 |
| CN | 102435019 A | 5/2012 |
| CN | 202255911 U | 5/2012 |
| CN | 102266829 B | 12/2012 |
| CN | 203264929 U | 11/2013 |

| | | |
|---|---|---|
| DE | 102011053182 | 3/2013 |
| DE | 112017003084 T5 | 6/2019 |
| DE | 112017003084 | 8/2025 |
| EP | 0576121 B1 | 3/1996 |
| EP | 969712 | 1/2000 |
| EP | 0963255 B1 | 10/2002 |
| EP | 0847307 B2 | 1/2003 |
| EP | 1426112 B1 | 6/2011 |
| EP | 3248463 A1 | 11/2017 |
| EP | 3565398 B1 | 6/2024 |
| FR | 2964047 A1 | 3/2012 |
| GB | 990346 A | 4/1965 |
| GB | 2322573 A | 9/1998 |
| JP | 2759711 B2 | 5/1998 |
| JP | 2000139245 A | 5/2000 |
| JP | 2005161221 A | 6/2005 |
| JP | 2010127694 A | 6/2010 |
| WO | WO-9712688 A1 | 4/1997 |
| WO | WO-WO1997012688 A1 | 4/1997 |
| WO | WO-98037751 | 9/1998 |
| WO | WO-9842178 A1 | 10/1998 |
| WO | WO-9916007 A1 | 4/1999 |
| WO | WO-1999016007 A1 | 4/1999 |
| WO | WO-2004023865 | 3/2004 |
| WO | WO-2004081499 | 9/2004 |
| WO | WO-2005048704 A2 | 6/2005 |
| WO | WO-2008059984 A1 | 5/2008 |
| WO | WO-2008112930 A1 | 9/2008 |
| WO | WO-2010105221 A1 | 9/2010 |
| WO | WO-2012022903 A1 | 2/2012 |
| WO | WO-2013135430 A1 | 9/2013 |
| WO | WO-2013191990 A2 | 12/2013 |
| WO | WO-2013191990 A3 | 12/2013 |
| WO | WO-2014201008 A1 | 12/2014 |
| WO | WO-2014210043 A1 | 12/2014 |
| WO | WO-2015058091 A1 | 4/2015 |
| WO | WO-2016030368 A1 | 3/2016 |
| WO | WO-2016145081 A2 | 9/2016 |
| WO | WO-2017124175 A1 | 7/2017 |
| WO | WO-2017192625 A1 | 11/2017 |
| WO | WO-2017223252 A1 | 12/2017 |
| WO | WO-2018129323 A1 | 7/2018 |
| WO | WO-2018129376 A2 | 7/2018 |
| WO | WO-2018129376 A3 | 7/2018 |
| WO | WO-2020252239 A1 | 12/2020 |
| WO | WO-2021066962 A1 | 4/2021 |
| WO | WO-2021263024 A1 | 12/2021 |
| WO | WO-2022216285 A1 | 10/2022 |
| WO | WO-2023278009 A1 | 1/2023 |
| WO | WO-2023081371 A1 | 5/2023 |
| WO | WO-2023215178 A1 | 11/2023 |

OTHER PUBLICATIONS

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

"U.S. Appl. No. 13/776,285, Notice of Allowance mailed Jan. 27, 2015", 5 pgs.

"U.S. Appl. No. 13/776,285, Notice of Allowance mailed May 4, 2015", 6 pgs.

"U.S. Appl. No. 13/776,285, Response filed Dec. 30, 2014 to Non Final Office Action mailed Jul. 30, 2014", 25 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

"U.S. Appl. No. 13/832,678, Notice of Allowance mailed Jul. 20, 2016", 13 pgs.

"U.S. Appl. No. 13/832,678, Response filed May 12, 2016 to Final Office Action mailed Mar. 17, 2016", 10 pgs.

"U.S. Appl. No. 13/832,678, Response filed Jul. 27, 2015 to Restriction Requirement mailed Jun. 9, 2015", 7 pgs.

(56)  References Cited

OTHER PUBLICATIONS

"U.S. Appl. No. 13/832,678, Response filed Dec. 31, 2015 to Non Final Office Action mailed Oct. 1, 2015", 10 pgs.

"U.S. Appl. No. 13/832,678, Restriction Requirement mailed Jun. 9, 2015", 7 pgs.

"U.S. Appl. No. 13/832,735, Final Office Action mailed Aug. 5, 2016", 29 pgs.

"U.S. Appl. No. 13/832,735, Non Final Office Action mailed Feb. 19, 2016", 26 pgs.

"U.S. Appl. No. 13/832,735, Non Final Office Action mailed Jul. 15, 2015", 22 pgs.

"U.S. Appl. No. 13/832,735, Response filed May 19, 2016 to Non Final Office Action mailed Feb. 19, 2016", 13 pgs.

"U.S. Appl. No. 13/832,735, Response filed Nov. 16, 2015 to Non-Final Office Action mailed Jul. 15, 2015", 16 pgs.

"U.S. Appl. No. 14/300,761, Advisory Action mailed Dec. 12, 2017", 3 pgs.

"U.S. Appl. No. 14/300,761, Examiner Interview Summary mailed Nov. 22, 2017", 3 pgs.

"U.S. Appl. No. 14/300,761, Final Office Action mailed Aug. 31, 2017", 11 pgs.

"U.S. Appl. No. 14/300,761, Final Office Action mailed Nov. 27, 2018", 16 pgs.

"U.S. Appl. No. 14/300,761, Final Office Action mailed Dec. 18, 2020", 14 pgs.

"U.S. Appl. No. 14/300,761, Non Final Office Action mailed Feb. 8, 2017", 13 pgs.

"U.S. Appl. No. 14/300,761, Non Final Office Action mailed Apr. 15, 2020", 17 pgs.

"U.S. Appl. No. 14/300,761, Non Final Office Action mailed May 24, 2018", 16 pgs.

"U.S. Appl. No. 14/300,761, Response filed Jun. 7, 2017 to Non Final Office Action mailed Feb. 8, 2017", 16 pgs.

"U.S. Appl. No. 14/300,761, Response filed Oct. 15, 2020 to Non Final Office Action mailed Apr. 15, 2020", 17 pgs.

"U.S. Appl. No. 14/300,761, Response filed Oct. 24, 2018 to Non Final Office Action mailed May 24, 2018", 22 pgs.

"U.S. Appl. No. 14/300,761, Response filed Nov. 29, 2019 to Final Office Action mailed Nov. 27, 2018", 21 pgs.

"U.S. Appl. No. 14/300,761, Response filed Dec. 20, 2016 to Restriction Requirement mailed Oct. 20, 2016", 15 pgs.

"U.S. Appl. No. 14/300,761, Resposne filed Nov. 16, 2017 to Final Office Action mailed Aug. 31, 2017", 16 pgs.

"U.S. Appl. No. 14/300,761, Restriction Requirement mailed Oct. 20, 2016", 9 pgs.

"U.S. Appl. No. 14/727,535, Corrected Notice of Allowance mailed Jan. 12, 2018", 2 pgs.

"U.S. Appl. No. 14/727,535, Final Office Action mailed Jun. 21, 2017", 6 pgs.

"U.S. Appl. No. 14/727,535, Non Final Office Action mailed Feb. 16, 2017", 17 pgs.

"U.S. Appl. No. 14/727,535, Notice of Allowance mailed Aug. 24, 2017", 5 pgs.

"U.S. Appl. No. 14/727,535, Preliminary Amendment filed Jun. 2, 2015", 9 pgs.

"U.S. Appl. No. 14/727,535, Response filed Jan. 17, 2017 to Restriction Requirement mailed Nov. 17, 2016", 12 pgs.

"U.S. Appl. No. 14/727,535, Response filed May 6, 2017 to Non Final Office Action mailed Feb. 16, 2017", 18 pgs.

"U.S. Appl. No. 14/727,535, Response filed Aug. 14, 2017 to Final Office Action mailed Jun. 21, 2017", 9 pgs.

"U.S. Appl. No. 14/727,535, Restriction Requirement mailed Nov. 17, 2016", 6 pgs.

"U.S. Appl. No. 14/899,946, Final Office Action malled Dec. 28, 2018", 41 pgs.

"U.S. Appl. No. 14/899,946, Non Final Office Action mailed Mar. 26, 2018", 37 pgs.

"U.S. Appl. No. 14/899,946, Response filed Aug. 27, 2018 to Non Final Office Action mailed Mar. 26, 2018", 27 pgs.

"U.S. Appl. No. 15/029,935, Final Office Action mailed Jul. 11, 2017", 6 pgs.

"U.S. Appl. No. 15/029,935, Non Final Office Action mailed Mar. 30, 2017", 21 pgs.

"U.S. Appl. No. 15/029,935, Notice of Allowance mailed Aug. 29, 2017", 5 pgs.

"U.S. Appl. No. 15/029,935, Preliminary Amendment filed Apr. 15, 2016", 3 pgs.

"U.S. Appl. No. 15/029,935, Reponse filed Aug. 16, 2017 to Final Office Action mailed Jul. 11, 2017", 11 pgs.

"U.S. Appl. No. 15/029,935, Response filed Jun. 15, 2017 to Non Final Office Action mailed Mar. 30, 2017", 12 pgs.

"U.S. Appl. No. 15/585,034, Non Final Office Action mailed Nov. 2, 2018", 25 pgs.

"U.S. Appl. No. 15/629,696, Corrected Notice of Allowability mailed Aug. 29, 2018", 4 pgs.

"U.S. Appl. No. 15/629,696, Corrected Notice of Allowability mailed Dec. 7, 2018", 2 pgs.

"U.S. Appl. No. 15/629,696, Ex Parte Quayle Action mailed May 3, 2018", 12 pgs.

"U.S. Appl. No. 15/629,696, Response filed Jul. 3, 2018 to Ex Parte Quayle Action mailed May 3, 2018", 13 pgs.

"U.S. Appl. No. 15/629,696, Response filed Nov. 13, 2018 to Examiner's Reasons for Allowance mailed May 3, 2018", 2 pgs.

"U.S. Appl. No. 15/703,818, Corrected Notice of Allowability mailed Jul. 8, 2019", 2 pgs.

"U.S. Appl. No. 15/703,818, Non Final Office Action mailed Oct. 11, 2018", 6 pgs.

"U.S. Appl. No. 15/703,818, Notice of Allowance mailed Mar. 20, 2019", 5 pgs.

"U.S. Appl. No. 15/703,818, Preliminary Amendment filed Nov. 3, 2017", 6 pgs.

"U.S. Appl. No. 15/703,8181, Response filed Jan. 11, 2019 to Non Final Office Action mailed Oct. 11, 2018", 9 pgs.

"U.S. Appl. No. 15/821,113, Corrected Notice of Allowability mailed Jan. 2, 2020", 2 pgs.

"U.S. Appl. No. 15/821,113, Corrected Notice of Allowability mailed Jan. 28, 2020", 2 pgs.

"U.S. Appl. No. 15/821,113, Ex Parte Quayle Action mailed Aug. 9, 2019", 4 pgs.

"U.S. Appl. No. 15/821,113, Notice of Allowance mailed Sep. 27, 2019", 5 pgs.

"U.S. Appl. No. 15/821,113, Notice of Allowance mailed Oct. 22, 2019", 5 pgs.

"U.S. Appl. No. 15/821,113, Notice of Non-Compliant Amendment mailed Jun. 11, 2019", 4 pgs.

"U.S. Appl. No. 15/821,113, Preliminary Amendment filed Jun. 28, 2018", 7 pgs.

"U.S. Appl. No. 15/821,113, Response filed Apr. 29, 2019 to Restriction Requirement mailed Nov. 30, 2018", 10 pgs.

"U.S. Appl. No. 15/821,113, Response filed Jul. 11, 2019 to Notice of Non-Compliant Amendment mailed Jun. 11, 2019", 12 pgs.

"U.S. Appl. No. 15/821,113, Response filed Sep. 9, 2019 to Ex Parte Quayle Action mailed Aug. 9, 2019", 3 pgs.

"U.S. Appl. No. 15/821,113, Restriction Requirement mailed Nov. 30, 2018", 6 pgs.

"U.S. Appl. No. 16/447,779, Corrected Notice of Allowability mailed May 26, 2021", 2 pgs.

"U.S. Appl. No. 16/447,779, Corrected Notice of Allowability mailed Sep. 9, 2021", 2 pgs.

"U.S. Appl. No. 16/447,779, Non Final Office Action mailed Jan. 12, 2021", 9 pgs.

"U.S. Appl. No. 16/447,779, Notice of Allowance mailed May 20, 2021", 5 pgs.

"U.S. Appl. No. 16/447,779, Preliminary Amendment filed Dec. 30, 2019", 4 pgs.

"U.S. Appl. No. 16/447,779, Response filed Apr. 12, 2021 to Non Final Office Action mailed Jan. 12, 2021", 7 pgs.

"U.S. Appl. No. 16/476,016, Advisory Action mailed Nov. 3, 2023", 3 pgs.

"U.S. Appl. No. 16/476,016, Corrected Notice of Allowability mailed Feb. 22, 2024", 3 pgs.

(56) References Cited

OTHER PUBLICATIONS

"U.S. Appl. No. 16/476,016, Corrected Notice of Allowability mailed Mar. 13, 2024", 2 pgs.
"U.S. Appl. No. 16/476,016, Corrected Notice of Allowability mailed Apr. 16, 2024", 2 pgs.
"U.S. Appl. No. 16/476,016, Decision on Pre-Appeal Brief Request mailed Dec. 18, 23", 2 pgs.
"U.S. Appl. No. 16/476,016, Examiner Interview Summary mailed Jan. 16, 2024", 2 pgs.
"U.S. Appl. No. 16/476,016, Examiner Interview Summary mailed Jan. 27, 2023", 2 pgs.
"U.S. Appl. No. 16/476,016, Examiner Interview Summary mailed Apr. 15, 2022", 2 pgs.
"U.S. Appl. No. 16/476,016, Examiner Interview Summary mailed Jun. 29, 2023", 2 pgs.
"U.S. Appl. No. 16/476,016, Examiner Interview Summary mailed Oct. 4, 2022", 2 pgs.
"U.S. Appl. No. 16/476,016, Final Office Action mailed Jan. 11, 2022", 15 pgs.
"U.S. Appl. No. 16/476,016, Final Office Action mailed Jul. 20, 2023", 21 pgs.
"U.S. Appl. No. 16/476,016, Final Office Action mailed Nov. 15, 2022", 20 pgs.
"U.S. Appl. No. 16/476,016, Non Final Office Action mailed Mar. 28, 2023", 22 pgs.
"U.S. Appl. No. 16/476,016, Non Final Office Action mailed Jun. 24, 2022", 15 pgs.
"U.S. Appl. No. 16/476,016, Non Final Office Action mailed Aug. 31, 2021", 14 pgs.
"U.S. Appl. No. 16/476,016, Notice of Allowability mailed May 21, 2024", 3 pgs.
"U.S. Appl. No. 16/476,016, Notice of Allowance mailed Feb. 14, 2024", 8 pgs.
"U.S. Appl. No. 16/476,016, Pre-Appeal Brief Request filed Nov. 20, 2023", 5 pgs.
"U.S. Appl. No. 16/476,016, Preliminary Amendment filed Jul. 3, 2019", 12 pgs.
"U.S. Appl. No. 16/476,016, Response filed Feb. 15, 2023 to Final Office Action mailed Nov. 15, 2022", 24 pgs.
"U.S. Appl. No. 16/476,016, Response filed Apr. 11, 2022 to Final Office Action mailed Jan. 11, 2022", 18 pgs.
"U.S. Appl. No. 16/476,016, Response filed Jun. 28, 2023 to Non Final Office Action mailed Mar. 28, 2023", 23 pgs.
"U.S. Appl. No. 16/476,016, Response filed Jul. 28, 2021 to Restriction Requirement mailed Apr. 30, 2021", 12 pgs.
"U.S. Appl. No. 16/476,016, Response filed Oct. 24, 2022 to Non Final Office Action mailed Jun. 24, 2022", 22 pgs.
"U.S. Appl. No. 16/476,016, Response filed Oct. 24, 2023 to Final Office Action mailed Jul. 20, 2023", 21 pgs.
"U.S. Appl. No. 16/476,016, Response filed Nov. 29, 2021 to Non Final Office Action mailed Aug. 31, 2021", 19 pgs.
"U.S. Appl. No. 16/476,016, Restriction Requirement mailed Apr. 30, 2021", 8 pgs.
"U.S. Appl. No. 16/476,069, Corrected Notice of Allowability mailed Jan. 30, 2023", 2 pgs.
"U.S. Appl. No. 16/476,069, Examiner Interview Summary mailed Mar. 18, 2022", 2 pgs.
"U.S. Appl. No. 16/476,069, Examiner Interview Summary mailed U.S. Appl. No. 16/476,069, Examiner Interview Summary mailed Oct. 28, 2022", 2 pgs.
"U.S. Appl. No. 16/476,069, Final Office Action mailed Jul. 25, 2022", 13 pgs.
"U.S. Appl. No. 16/476,069, Non Final Office Action mailed Nov. 12, 2021", 13 pgs.
"U.S. Appl. No. 16/476,069, Notice of Allowance mailed Jan. 19, 2023", 8 pgs.
"U.S. Appl. No. 16/476,069, Notice of Allowance mailed Apr. 20, 2023", 8 pgs.
"U.S. Appl. No. 16/476,069, Preliminary Amendment filed Jul. 3, 2019", 13 pgs.

"U.S. Appl. No. 16/476,069, Response filed Apr. 11, 2022 to Non Final Office Action mailed Nov. 12, 2021", 12 pgs.
"U.S. Appl. No. 16/476,069, Response filed Jul. 27, 2021 to Restriction Requirement mailed May 3, 2021", 10 pgs.
"U.S. Appl. No. 16/476,069, Response filed Oct. 25, 2022 to Final Office Action mailed Jul. 25, 2022", 13 pgs.
"U.S. Appl. No. 16/476,069, Restriction Requirement mailed May 3, 2021", 9 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Preliminary Amendment filed Jan. 28, 2021", 8 pgs.
"U.S. Appl. No. 17/224,955, Final Office Action mailed Aug. 15, 2022", 6 pgs.
"U.S. Appl. No. 17/224,955, Non Final Office Action mailed Mar. 7, 2022", 7 pgs.
"U.S. Appl. No. 17/224,955, Notice of Allowance mailed Oct. 27, 2022", 5 pgs.
"U.S. Appl. No. 17/224,955, Response filed Aug. 3, 2022 to Non Final Office Action mailed Mar. 7, 2022", 12 pgs.
"U.S. Appl. No. 17/224,955, Supplemental Notice of Allowability mailed Feb. 22, 2023", 2 pgs.
"U.S. Appl. No. 17/224,955, Supplemental Notice of Allowability mailed Mar. 1, 2023", 2 pgs.
"U.S. Appl. No. 17/410,852, Corrected Notice of Allowability mailed Mar. 6, 2024", 2 pgs.
"U.S. Appl. No. 17/410,852, Corrected Notice of Allowability mailed Mar. 13, 2024", 2 pgs.
"U.S. Appl. No. 17/410,852, Corrected Notice of Allowability mailed May 31, 2024", 2 pgs.
"U.S. Appl. No. 17/410,852, Final Office Action mailed Nov. 14, 2023", 8 pgs.
"U.S. Appl. No. 17/410,852, Non Final Office Action mailed Aug. 1, 2023", 9 pgs.
"U.S. Appl. No. 17/410,852, Notice of Allowance mailed Feb. 28, 2024", 5 pgs.
"U.S. Appl. No. 17/410,852, Preliminary Amendment filed Dec. 10, 2021", 8 pgs.
"U.S. Appl. No. 17/410,852, Response filed Feb. 14, 2024 to Final Office Action mailed Nov. 14, 2023", 10 pgs.
"U.S. Appl. No. 17/410,852, Response filed Nov. 1, 2023 to Non Final Office Action mailed Aug. 1, 2023", 15 pgs.
"U.S. Appl. No. 17/465,644, Notice of Allowance mailed Mar. 21, 2024", 12 pgs.
"U.S. Appl. No. 17/465,644, Preliminary Amendment filed Dec. 17, 2021", 11 pgs.
"U.S. Appl. No. 17/465,644, Response filed Dec. 13, 2023 to Restriction Requirement mailed Oct. 13, 2023", 11 pgs.
"U.S. Appl. No. 17/465,644, Restriction Requirement mailed Oct. 13, 2023", 6 pgs.
"U.S. Appl. No. 17/809,223, Final Office Action mailed Jul. 19, 2023", 17 pgs.
"U.S. Appl. No. 17/809,223, Non Final Office Action mailed Jan. 19, 2024", 17 pgs.

(56)                References Cited

OTHER PUBLICATIONS

"U.S. Appl. No. 17/809,223, Non Final Office Action mailed Feb. 15, 2023", 15 pgs.
"U.S. Appl. No. 17/809,223, Preliminary Amendment filed Nov. 3, 2022", 7 pgs.
"U.S. Appl. No. 17/809,223, Response filed Apr. 19, 2024 to Non Final Office Action mailed Jan. 19, 2024", 19 pgs.
"U.S. Appl. No. 17/809,223, Response filed Jun. 14, 2023 to Non Final Office Action mailed Feb. 15, 2023", 17 pgs.
"U.S. Appl. No. 17/809,223, Response filed Dec. 19, 2023 to Final Office Action mailed Jul. 19, 2023", 14 pgs.
"U.S. Appl. No. 18/164,321, Preliminary Amendment Filed Jul. 7, 2023", 7 pgs.
"U.S. Appl. No. 18/355,926, Preliminary Amendment", 6 pgs.
"U.S. Appl. No. 18/355,926, Preliminary Amendment filed Jan. 10, 2024", 6 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 2 pgs.
"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Australian Application Serial No. 2020357581, First Examination Report mailed Feb. 2, 2023", 2 pgs.
"Australian Application Serial No. 2021209314, First Examination Report mailed Jan. 9, 2023", 5 pgs.
"Australian Application Serial No. 2021209314, Response filed Jul. 6, 2023 to First Examination Report mailed Jan. 9, 2023", 10 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Office Action mailed Nov. 6, 2018", (w/ English Translation), 6 pgs.
"Brazilian Application Serial No. 1120160085175, Office Action mailed Dec. 4, 2023", w/ Machine English translation, 9 pgs.
"Brazilian Application Serial No. 1120160085175, Response filed Feb. 14, 2024 to Office Action mailed Dec. 4, 2023", w/ Machine English Translation, 10 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Office Action mailed Sep. 6, 2022", W/ English Translation, 6 pgs.

"Brazilian Application Serial No. 1120180747017, Opinion for non-patenteability mailed Mar. 29, 2022", (w/ English Translation), 18 pgs.
"Brazilian Application Serial No. 1120180747017, Response filed Jul. 4, 2022 Opinion for non-patentability mailed Mar. 29, 2022", (w/ Concise Statement of Relevance), 22 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Response filed Dec. 5, 2022 to Office Action mailed Sep. 6, 2022", w/ English Translation, 2 pgs.
"Brazilian Application Serial No. 1120180747017, Voluntary Amendment filed Jun. 22, 2020", (w/ English Translation), 44 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Dec. 18, 2019 to Office Action mailed Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Jul. 23, 2019", 3 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Examiners Rule 86(2) Report mailed Jul. 6, 2023", 5 pgs.
"Canadian Application Serial No. 3,049,391, Office Action mailed Sep. 4, 2020", 4 pgs.
"Canadian Application Serial No. 3,049,391, Office Action mailed Sep. 26, 2022", 4 pgs.
"Canadian Application Serial No. 3,049,391, Office Action mailed Dec. 1, 2021", 4 pgs.
"Canadian Application Serial No. 3,049,391, Response filed Jan. 20, 2023 to Office Action mailed Sep. 26, 2022", 7 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"Canadian Application Serial No. 3,049,391, Response filed Nov. 2, 2023 to Examiners Rule 86(2) Report mailed Jul. 6, 2023", 7 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"Canadian Application Serial No. 3,185,961, Examiners Rule 86(2) Report mailed May 6, 2024", 3 pgs.
"Canadian Application Serial No. 3153465, Examiners Rule 86(2) Report mailed Jan. 13, 2023" 13 pgs.

(56)                    References Cited

OTHER PUBLICATIONS

"Canadian Application Serial No. 3153465, Response filed May 1, 2023 to Examiners Rule 86(2) Report mailed Jan. 13, 2023", 2 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Communication Pursuant to Article 94(3) EPC mailed Apr. 3, 2023", 4 pgs.
"European Application Serial No. 18735853.6, Communication Pursuant to Article 94(3) EPC mailed Jun. 10, 2022", 3 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18735853.6, Response filed Sep. 12, 2023 to Communication Pursuant to Article 94(3) EPC mailed Apr. 3, 2023", 9 pgs.
"European Application Serial No. 18735853.6, Response filed Oct. 18, 2022 to Communication Pursuant to Article 94(3) EPC mailed Jun. 10, 2022", 24 pgs.
"European Application Serial No. 18735853.6, Response filed Oct. 28, 2021 to Communication Pursuant to Article 94(3) EPC mailed Jun. 18, 2021", 17 pgs.
"European Application Serial No. 18736496.3, Communication Pursuant to Article 94(3) EPC mailed Mar. 24, 2023", 10 pgs.
"European Application Serial No. 18736496.3, Communication Pursuant to Article 94(3) EPC mailed Dec. 12, 2023", 13 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response filed Aug. 3, 2023 to Communication Pursuant to Article 94(3) EPC mailed Mar. 24, 2023", 10 pgs.
"European Application Serial No. 18736496.3, Response to Communication Pursuant to Rules 161(2) and 162 EPC filed Feb. 28, 2020", 14 pgs.
"European Application Serial No. 20872967.3, Extended European Search Report mailed Sep. 29, 2023", 9 pgs.
"European Application Serial No. 20872967.3, Response to Communication Pursuant to Rules 161 and 162 EPC filed Nov. 17, 2022", 9 pgs.
"German Application Serial No. 11 2017 003 084.6, Office Action mailed Feb. 5, 2019", (w/ English Translation), 5 pgs.
"German Application Serial No. 11 2017 003 084.6, Office Action mailed Aug. 31, 2023", w/English Claims, 14 pgs.
"German Application Serial No. 11 2017 003 084.6, Response filed Mar. 6, 2024 to Office Action mailed Aug. 31, 2023", w/ English Claims, 13 pgs.
"German Application Serial No. 11 2017 003 084.6, Response filed May 8, 2019 to Office Action mailed Feb. 5, 2019", (w/ Concise Statement of Relevance), 17 pgs.

"International Application Serial No. PCT/US2013/045445, International Preliminary Report on Patentability mailed Dec. 31, 2014", 7 pgs.
"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.
"International Application Serial No. PCT/US2014/043926, International Search Report mailed Nov. 3, 2014", 2 pgs.
"International Application Serial No. PCT/US2014/043926, Written Opinion mailed Nov. 3, 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.
"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 28, 2017", 5 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Preliminary Report on Patentability mailed Apr. 14, 2022", 6 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/026252, International Preliminary Report on Patentability mailed Oct. 19, 2023", 6 pgs.

(56)  References Cited

OTHER PUBLICATIONS

"International Application Serial No. PCT/US2021/026252, International Search Report mailed Jun. 15, 2021", 2 pgs.
"International Application Serial No. PCT/US2021/026252, Written Opinion mailed Jun. 15, 2021", 4 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Dietz, John, "A five-part program for efficient farming", Farming, (Apr. 2000), 1-4.
Elmore, Clyde L., "Soil Solarization A Nonpesticidal Method for Controlling Diseases, Nematodes, and Weeds", University of California Division of Agriculture and Natural Resources Publication 21377, (1997), 1-17.
Van Zuydam, R. P, "A driver's steering aid for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements in the Open Field by Means of Real Time Kinematic Dgps", Proceedings of the Fourth International Conference on Precision Agriculture, (1999), 1023-1034.
"U.S. Appl. No. 14/300,761, Notice of Allowance mailed May 7, 2021", 16 pgs.
"U.S. Appl. No. 14/300,761, Notice of Allowance mailed Sep. 9, 2021", 16 pgs.
"U.S. Appl. No. 14/300,761, Response filed Apr. 19, 2021 to Final Office Action mailed Dec. 18, 2020", 19 pgs.
"U.S. Appl. No. 16/731,325, Corrected Notice of Allowability mailed Jun. 15, 2021", 2 pgs.
"U.S. Appl. No. 16/731,325, Notice of Allowance mailed Mar. 23, 2021", 5 pgs.
"U.S. Appl. No. 17/161,453, Corrected Notice of Allowability mailed Feb. 23, 2024", 3 pgs.
"U.S. Appl. No. 17/161,453, Corrected Notice of Allowability mailed Feb. 29, 2024", 2 pgs.
"U.S. Appl. No. 17/161,453, Final Office Action mailed Sep. 7, 2023", 7 pgs.
"U.S. Appl. No. 17/161,453, Non Final Office Action mailed Mar. 15, 2023", 17 pgs.
"U.S. Appl. No. 17/161,453, Notice of Allowance mailed Nov. 22, 2023", 5 pgs.
"U.S. Appl. No. 17/161,453, Response filed Jun. 15, 2023 to Non Final Office Action mailed Mar. 15, 2023", 15 pgs.
"U.S. Appl. No. 17/161,453, Response filed Nov. 7, 2023 to Final Office Action mailed Sep. 7, 2023", 8 pgs.
"U.S. Appl. No. 17/465,644, Supplemental Notice of Allowability mailed Jun. 27, 2024", 2 pgs.
"U.S. Appl. No. 17/504,601, Preliminary Amendment filed Dec. 22, 2021", 7 pgs.
"U.S. Appl. No. 17/809,223, Advisory Action mailed Sep. 18, 2024", 3 pgs.
"U.S. Appl. No. 17/809,223, Examiner Interview Summary mailed Sep. 10, 2024", 3 pgs.
"U.S. Appl. No. 17/809,223, Final Office Action mailed Jun. 13, 2024", 19 pgs.
"U.S. Appl. No. 17/809,223, Non Final Office Action mailed Dec. 27, 2024", 7 pgs.
"U.S. Appl. No. 17/809,223, Notice of Allowance mailed Apr. 25, 2025", 5 pgs.
"U.S. Appl. No. 17/809,223, Response filed Mar. 27, 2025 to Non Final Office Action mailed Dec. 27, 2024", 11 pgs.
"U.S. Appl. No. 17/809,223, Response filed Sep. 13, 2024 to Final Office Action mailed Jun. 13, 2024", 18 pgs.
"U.S. Appl. No. 18/140,491, Preliminary Amendment Filed May 3, 2023", 15 pgs.
"U.S. Appl. No. 18/164,321, Final Office Action mailed Nov. 20, 2024", 7 pgs.

"U.S. Appl. No. 18/164,321, Non Final Office Action mailed Jun. 4, 2024", 7 pgs.
"U.S. Appl. No. 18/164,321, Notice of Allowability mailed Aug. 15, 2025", 2 pgs.
"U.S. Appl. No. 18/164,321, Notice of Allowance mailed May 15, 2025", 5 pgs.
"U.S. Appl. No. 18/164,321, Notice of Allowance mailed Jun. 25, 2025", 9 pgs.
"U.S. Appl. No. 18/164,321, PTO Response to Rule 312 Communication mailed Jul. 15, 2025", 2 pgs.
"U.S. Appl. No. 18/164,321, Response filed May 7, 2025 to Final Office Action mailed Nov. 20, 2024", 9 pgs.
"U.S. Appl. No. 18/164,321, Response Filed Nov. 4, 2024 to Non Final Office Action mailed Jun. 4, 2024", 17 pgs.
"U.S. Appl. No. 18/355,926, Examiner Interview Summary mailed Nov. 26, 2024", 2 pgs.
"U.S. Appl. No. 18/355,926, Final Office Action mailed Jul. 15, 2025", 11 pgs.
"U.S. Appl. No. 18/355,926, Non Final Office Action mailed Feb. 12, 2025", 10 pgs.
"U.S. Appl. No. 18/355,926, Response filed Feb. 3, 2025 to Restriction Requirement mailed Dec. 3, 2024", 8 pgs.
"U.S. Appl. No. 18/355,926, Response filed May 12, 2025 to Non Final Office Action mailed Feb. 12, 2025", 13 pgs.
"U.S. Appl. No. 18/355,926, Restriction Requirement mailed Aug. 30, 2024", 10 pgs.
"U.S. Appl. No. 18/355,926, Restriction Requirement mailed Dec. 3, 2024", 10 pgs.
"U.S. Appl. No. 18/575,725, Supplemental Preliminary Amendment filed Jan. 16, 2024", 11 pgs.
"Application Serial No. 18/750.201, Preliminary Amendment filed Sep. 5, 2024", 12 pgs.
"Australian Application Serial No. 2021297320, First Examination Report mailed Nov. 7, 2023", 2 pgs.
"Australian Application Serial No. 2021297320, Response filed Feb. 22, 24 to First Examination Report mailed Nov. 7, 2023", 17 pgs.
"Australian Application Serial No. 2021439481, First Examination Report mailed Sep. 19, 2024", 13 pgs.
"Australian Application Serial No. 2023214344, First Examination Report mailed Sep. 9, 2024", 2 pgs.
"Australian Application Serial No. 2023214344, Response filed Jun. 18, 2025 to First Examination Report mailed Sep. 9, 2024", 154 pgs.
"Australian Application Serial No. 2023258379, First Examination Report mailed Jan. 16, 2025", 4 pgs.
"Australian Application Serial No. 2023258379, Response filed Mar. 13, 2025 to First Examination Report mailed Jan. 16, 2025", 3 pgs.
"Brazil Application Serial No. BR112022006486-1, Office Action mailed Jul. 13, 2024", w/ English translation, 9 pgs.
"Brazil Application Serial No. BR112022006486-1, Response filed Oct. 25, 2024 to Office Action mailed Jul. 13, 2024", w/ English Claims, 227 pgs.
"Canadian Application Serial No. 2,877,195, Examiner's Rule 86(2) Report filed Nov. 21, 2022", 3 pgs.
"Canadian Application Serial No. 2,877,195, Office Action mailed Jun. 5, 2023", 3 pgs.
"Canadian Application Serial No. 2,877,195, Response filed Mar. 20, 23 to Examiner's Rule 86(2) Report filed Nov. 21, 2022", 7 pgs.
"Canadian Application Serial No. 2,877,195, Response filed Apr. 8, 2021 to Office Action mailed Dec. 9, 2020", 16 pgs.
"Canadian Application Serial No. 2,877,195, Response filed Oct. 4, 2023 to Office Action mailed Jun. 5, 2023", 7 pgs.
"Canadian Application Serial No. 3,185,961, Response filed Aug. 12, 24 to Examiners Rule 86(2) Report mailed May 6, 2024", 8 pgs.
"Canadian Application Serial No. 3,214,361, Office Action mailed Jan. 28, 2025", 6 pgs.
"Canadian Application Serial No. 3,214,361, Response filed May 23, 2025 to Office Action mailed Jan. 28, 2025", 94 pgs.
"Electrostatic Dispersal Solutions", https://web.archive.org/web/20170928035648/https://www.4rysprays.com/, (Captured on Sep. 28, 2017), 6 pgs.

(56)  References Cited

OTHER PUBLICATIONS

"European Application Serial No. 18736496.3, Response filed Jun. 10, 2024 to Communication Pursuant to Article 94(3) EPC mailed Dec. 12, 2023", 13 pgs.

"European Application Serial No. 21827830.7, Voluntary Admendment filed Aug. 9, 2023", 6 pgs.

"European Application Serial No. 21936210.0, Extended European Search Report mailed Dec. 18, 2024", 11 pgs.

"European Application Serial No. 21936210.0, Response filed Jul. 10, 2025 to Extended European Search Report mailed Dec. 18, 2024", 47 pgs.

"European Application Serial No. 24174311.1, Extended European Search Report mailed Jul. 10, 2024", 5 pgs.

"European Application Serial No. 24174311.1, Response filed Feb. 6, 2025 to Extended European Search Report mailed Jul. 10, 2024", 16 pgs.

"International Application Serial No. PCT/US2021/038955, International Preliminary Report on Patentability mailed Jan. 5, 2023", 7 pgs.

"International Application Serial No. PCT/US2021/038955, International Search Report mailed Sep. 29, 2021", 2 pgs.

"International Application Serial No. PCT/US2021/038955, Written Opinion mailed Sep. 29, 2021", 5 pgs.

"International Application Serial No. PCT/US2022/027707, on Patentability mailed Jan. 11, 2024", 11 pgs.

"International Application Serial No. PCT/US2022/027707, International Search Report mailed Aug. 17, 2022", 5 pgs.

"International Application Serial No. PCT/US2022/027707, Written Opinion mailed Aug. 17, 2022", 9 pgs.

"International Application Serial No. PCT/US2022/048981, International Search Report mailed Apr. 13, 2023", 6 pgs.

"International Application Serial No. PCT/US2022/048981, Invitation to Pay Additional Fees mailed Jan. 19, 2023", 5 pgs.

"International Application Serial No. PCT/US2022/048981, Written Opinion mailed Apr. 13, 2023", 18 pgs.

"International Application Serial No. PCT/US2023/020275, International Search Report mailed Jul. 26, 2023", 2 pgs.

"International Application Serial No. PCT/US2023/020275, Written Opinion mailed Jul. 26, 2023", 12 pgs.

"Wilger 2019-20 Manufacturer's Suggested Retail Price List", (Revised Sep. 1, 2019), 20 pgs.

EI Operator, "Direct injection into the nozzle", [Online]. Retrieved from the Internet: <https://www.eioperator.com/direct-injection-into-the-nozzle/>, (Accessed online Jul. 30, 2025), 7 pages.

Luck, et al., "A Case Study Concerning The Effects Of Controller Response And Turning Movements On Application Rate Uniformity With A Self-Propelled Sprayer", Biological Systems Engineering, University of Nebraska, [Online]. Retrieved from the Internet: <https://elibrary.asabe.org/abstract.asp?aid=36445>, (Dec. 12, 2011), 10 pgs.

Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.

"U.S. Appl. No. 18/164,321, Supplemental Notice of Allowability mailed Oct. 6, 2025", 2 pgs.

"European Application Serial No. 24174311.1, Communication Pursuant to Article 94(3) EPC mailed Oct. 9, 2025", 4 pgs.

"U.S. Appl. No. 18/355,926, Response filed Dec. 10, 2025 to Final Office Action mailed Jul. 15, 2025", 11 pgs.

"U.S. Appl. No. 19/279,385, Preliminary Amendment filed Nov. 24, 2025", 6 pgs.

"U.S. Appl. No. 19/350,572, Preliminary Amendment filed Dec. 10, 2025", 7 pgs.

NOZZLE CONTROL SYSTEM AND METHOD

CLAIM OF PRIORITY

This patent application is a continuation of U.S. patent application Ser. No. 17/410,852, filed Aug. 24, 2021, which application is a continuation of U.S. patent application Ser. No. 16/447,779, filed Jun. 20, 2019, which is a continuation of U.S. patent application Ser. No. 15/703,818, filed Sep. 13, 2017, issued on Aug. 6, 2019 as U.S. Pat. No. 10,368,538, which application is a continuation of U.S. patent application Ser. No. 15/029,935, filed Apr. 15, 2016, which is a U.S. National Stage Filing under 35 U.S.C. 371 from International Application No. PCT/US2014/061150, filed Oct. 17, 2014, and published as WO 2015/058091 on Apr. 23, 2015, which claims the benefit of priority of U.S. Provisional Patent Application Ser. No. 61/892,339, filed on Oct. 17, 2013, which are herein incorporated by reference in their entirety.

COPYRIGHT NOTICE

TECHNICAL FIELD

This document pertains generally, but not by way of limitation, to a nozzle control system and method for the application of products (granular, fluid, or gaseous) to crops or a field.

BACKGROUND

Agricultural sprayers are used to distribute agricultural products, such as fertilizers, insecticides, herbicides and fungicides, to a field or crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds, or streams. Irregular shapes and contour changes can provide challenges in even distribution of agricultural products and can lead to waste of the agricultural product. Additionally, the configuration of the agricultural sprayer itself may cause unpredictable variation in application of the agricultural product.

Agricultural sprayers include a reservoir for a carrier substance. The reservoir is in communication, by way of a header tube, or pipe, with a plurality of sections provided along one or more carrier booms (e.g., boom tubes along the booms). The header is the main line extending between the reservoir and the carrier booms. Each of the plurality of sections includes multiple sprayer nozzles that distribute the carrier substance received by the section. The carrier substance includes the carrier substance, such as water, and, in one example, agricultural products dispersed into the carrier substance, for instance herbicides, pesticides, fertilizers, or the like.

OVERVIEW

The present inventors have recognized, among other things, that a problem to be solved can include controlling dispersion of an agricultural product, such as from an agricultural sprayer boom. In an example, the present subject matter can provide a solution to this problem, such as by providing a nozzle control system and method capable of determining a nozzle specific flow rate for each nozzle on the boom and controlling the flow rate for each nozzle on the boom. Such a system includes an electronic control unit at each nozzle configured to receive and manipulate a number of inputs, such as nozzle position on a boom, length of the boom, nozzle spacing, yaw rate of the boom, target nozzle flow rate for the system, yaw rate of the agricultural sprayer, speed of the agricultural sprayer, the overall system pressure, agricultural product characteristics. That is, the present subject matter can provide a solution to the above problem by controlling the flow rate at each nozzle to provide a uniform distribution of agricultural product over a field.

The present inventors have recognized, among other things, that a problem to be solved can include controlling dispersion of an agricultural product, such as from an agricultural sprayer boom, according to field or crop specific characteristics. In an example, the present subject matter can provide a solution to this problem, such as by providing a nozzle control system and method including one or more location fiducials associated with the system, the one or more location fiducials configured to mark the location of one or more nozzles of the plurality of nozzles on a field map. Further, each of the nozzles of the plurality of nozzles of the system is configured to dispense the agricultural product at individual rates according to the location the one or more nozzles of the plurality of nozzles on the field map.

The present inventors have recognized, among other things, that a problem to be solved can include boom, row, or section control of an agricultural delivery system. In an example, the present subject matter can provide a solution to this problem, such as by providing greater control to individual sections or rows of an agricultural product delivery system by a control method and system for delivering an agricultural product configured through flow rate control of the agricultural product at each individual nozzle or nozzle group of the agricultural delivery system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

The drawings illustrate generally, by way of example, but not by way of limitation, various embodiments discussed in the present document.

DETAILED DESCRIPTION

Figure 1:
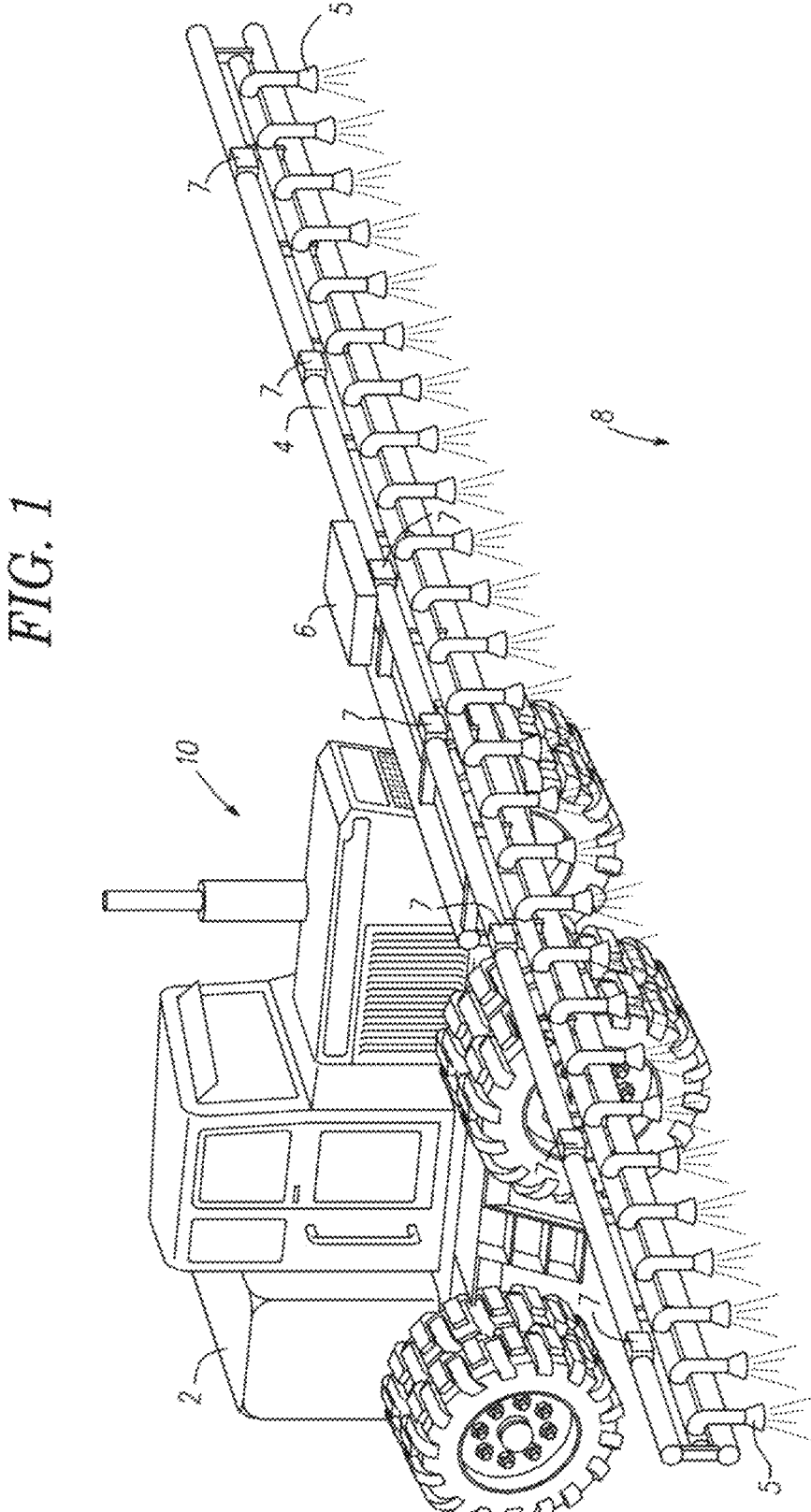
FIG. 1 is a perspective view of one example of an agricultural sprayer.

As illustrated in FIG. 1, an agricultural sprayer 10 includes a reservoir tank 2, one or more sprayer booms 4, including one or more nozzles 5, one or more electronic control units (ECU) 7 (e.g., a microprocessor based system), and a master node 6. (e.g., a microprocessor based system) In an example, the agricultural sprayer 10 includes an integral reservoir tank 2 or a tow behind reservoir tank. The reservoir tank 2, in an example, includes the agricultural product mixed with a carrier fluid, such as water, or the carrier fluid and the agricultural product are mixed in-line prior to or at the sprayer boom 4. The nozzles 5 are positioned along the sprayer boom 4 to deliver the agricultural product to a crop or an agricultural field 8. Crops include, but are not limited to, any product grown in an agricultural field, such as row and non-row based crops. Agricultural products include, but are not limited to, fertilizers, water, pesticides, fungicides, herbicides, or the like. As shown, the agricultural sprayer 10 includes master node 6, as described herein. The master node 6, as will be discussed herein, operates in conjunction with the one or more ECU 7 to control delivery of the agricultural product from the reservoir tank 2, to the sprayer boom 4 and the associated nozzles 5 for delivery to the agricultural field or crop.

Figure 2:
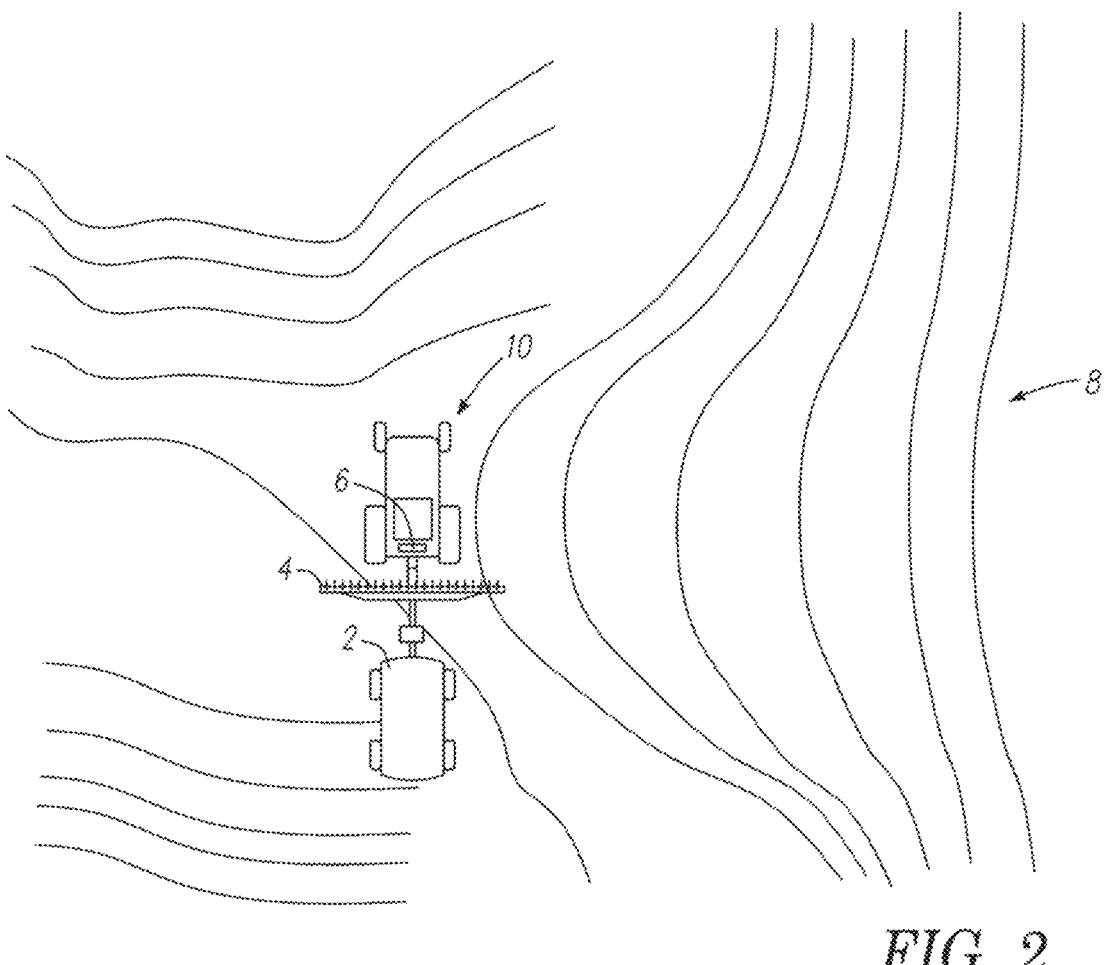
FIG. 2 is a top view of one example of an agricultural sprayer and an agricultural field.

As illustrated in FIG. 2, an example of an agricultural sprayer 10 is provided in an agricultural field 8 and delivering an agricultural product. The agricultural sprayer 10 includes a tow behind reservoir tank 2, one or more sprayer booms 4 (e.g., dual booms extending from the center of the sprayer 10), and the master node 6. As described herein, the controller 6 controls delivery of the agricultural product to the agricultural field 8 or crops.

Figure 3:
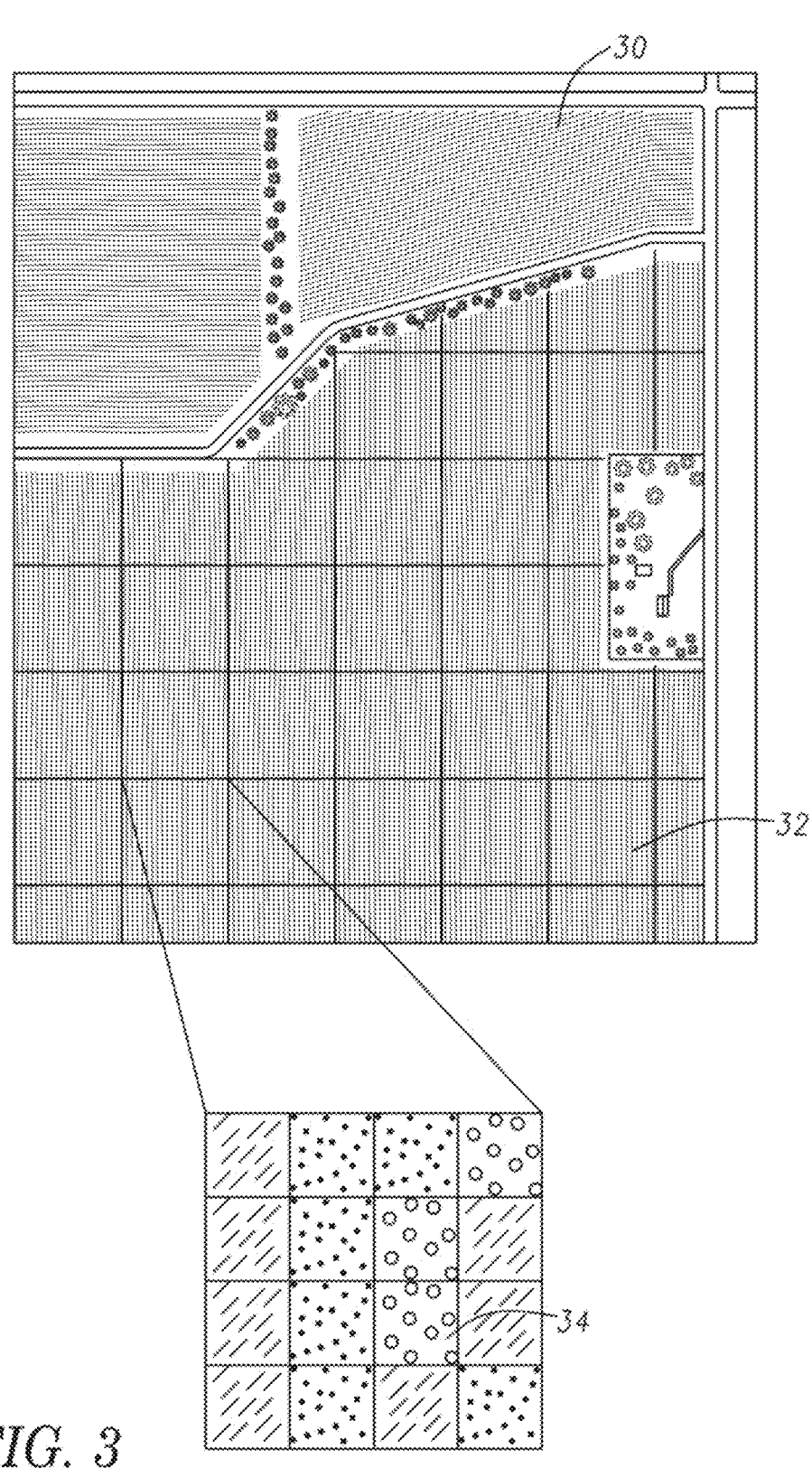
FIG. 3 is one example of a field moisture content map including crop moisture content values associated with corresponding field locations.

FIG. 3 is a demonstrative example of a field map 30. Optionally the yield map 30 includes but is not limited to providing a visual representation of agricultural product delivery instructions, such as, but not limited to, a soil characteristic, crop yield, agricultural product instructions, or any combination thereof. A zoomed in portion of the field map 30 is shown in the bottom view of FIG. 3. As shown by way of varying stippling, shading, or the like a plurality of zones 32 accordingly has corresponding agricultural product delivery instructions (e.g., agricultural product type or flow rate, etc.), magnitude of the comparison, or type of calibration instruction. For instance, as shown in FIG. 3, a plurality of zones 32 having a varying agricultural product delivery instructions are associated with the one or more zones 32. Accordingly each of the zones 32 includes in one example an array of information including the agricultural product delivery instructions. The field map 30 accordingly provides a representation to the operator of the agricultural product delivery demands during an agricultural product delivery operation. Information provided by the field map 30 is optionally used for instance to determine better husbandry techniques, planting strategies and the like for the field in the next season.

Referring again to FIG. 3, the plurality of zones 32 include sub-zones 34. As shown, each of the zones and sub-zones has different stippling, shading or the like associated with the true harvested crop characteristic. Optionally the sub-zones 34 (or any of the plurality of zones 32) have varying stippling, shading or coloring techniques or any combination thereof to accordingly provide indications of calibration instructions, magnitude of comparisons, or both. As shown in FIG. 3, by way of the stippling, shading, coloring or the like the agricultural product delivery instructions vary between each of the zones 32. As shown for instance, each of the sub-zones 34 the stippling is different between the zones thereby indicating agricultural product delivery instructions, such as agricultural product type, there between varies. Optionally the field map 30 provides one or more interactive zones 32. For instance the user is able to zoom in and examine each of the zones 32 accordingly allowing for instance through a graphical user interface interaction with the field map 30 to accordingly determine the agricultural product delivery instructions of one or a plurality of the zones 32.

Figure 4:
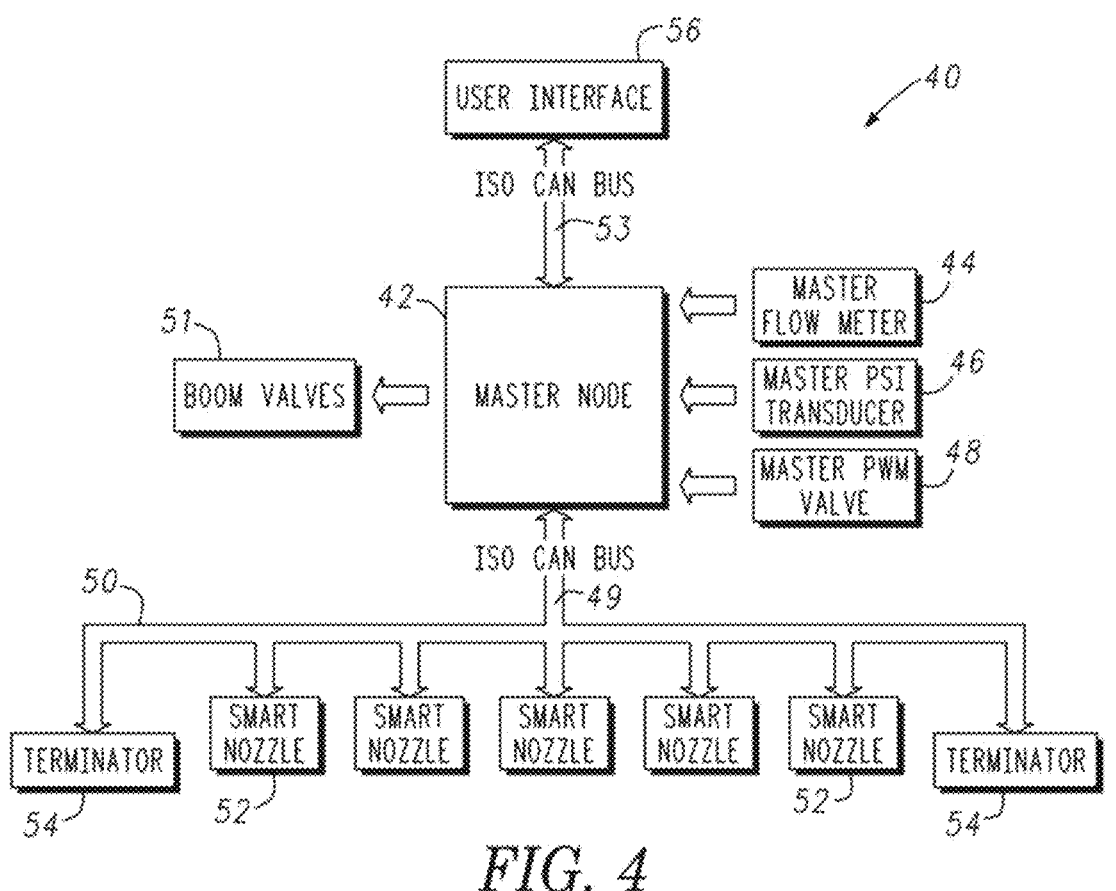
FIG. 4 is an exemplary schematic view of an overall nozzle control system.

FIG. 4 illustrates a schematic of an exemplary overall nozzle control system 40, wherein one or more nozzles 52 located on a boom 50 are capable of controlling a respective nozzle flow rate of an agricultural product dispensed from the nozzle 52. As shown in FIG. 4, a master node 42 is further communicatively coupled to one or more valves of the boom 51, such that system pressure within the boom 50 can be controlled by the master node 42. However, unlike prior systems, the master node 42 of the current system is not configured to control the flow rate within the system 40, boom 50, or at the smart nozzles 52. The master node 42 includes inputs from a master flowmeter 44, a master pressure transducer 46, and a master pulse width modulation (PWM) valve 48. The master node controls 42 the master PWM valve 48 so as to maintain the targeted system pressure, such that a desired droplet size of the agricultural product is obtained out of the nozzles 52. For example, environmental conditions, such as wind, humidity, rain, or temperature, field characteristics, or user preference determine whether a smaller or larger droplet size of the agricultural product is preferred. By maintaining a constant system pressure, the preferred droplet size can be obtained and maintained by the current system.

Figure 5:
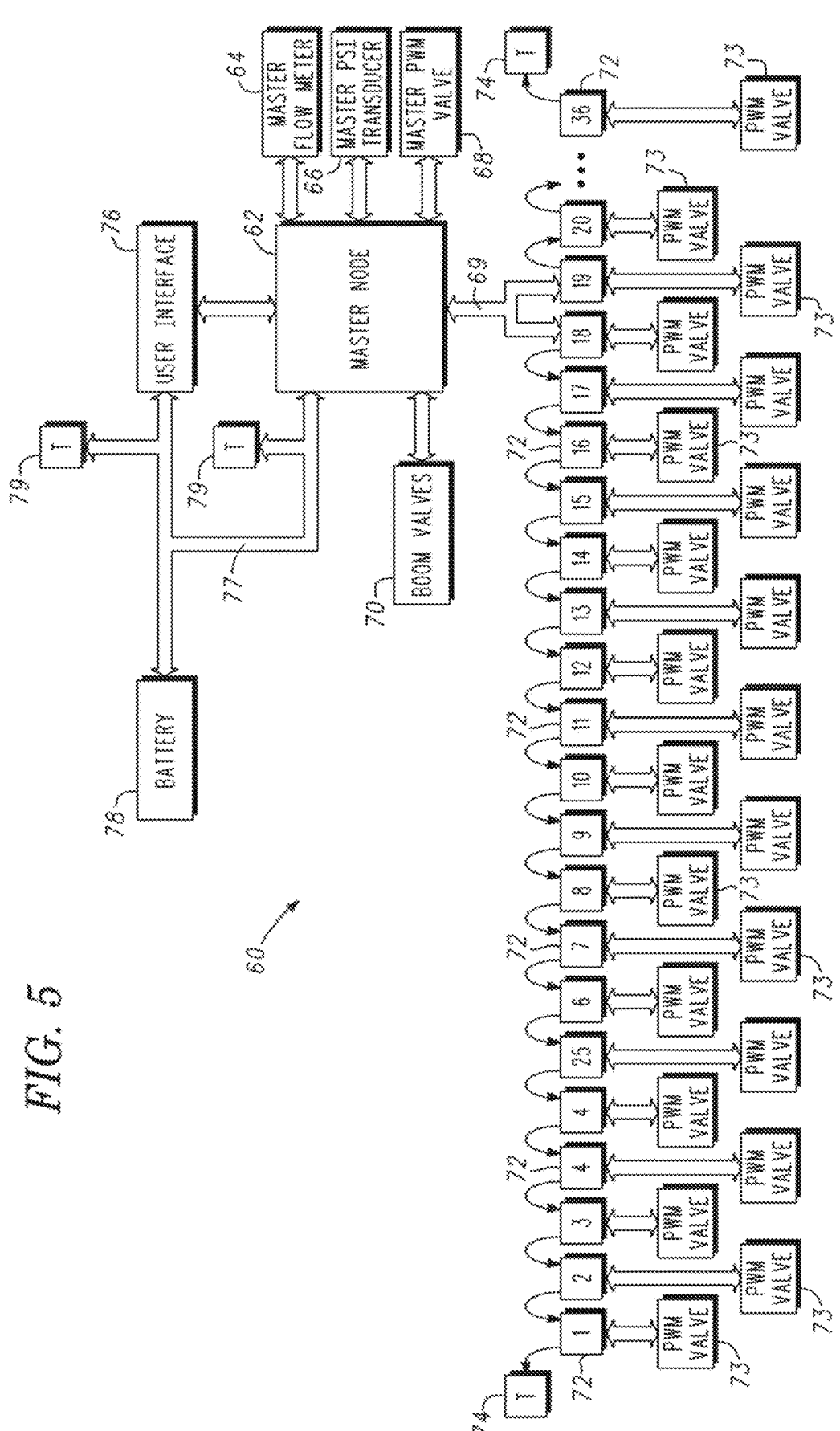
FIG. 5 is a detailed schematic view of an exemplary nozzle control system.

In the exemplary embodiment, each of the nozzles 52 is a smart nozzle that includes an electronic control unit (ECU) that regulates, determines, and/or controls the nozzle flow rate of the agricultural product dispensed from the nozzle 52, as discussed in reference to FIG. 5. In other embodiments, a group of nozzles 52 are associated with a common ECU and as a group be considered a single smart nozzle. The smart nozzles 52 are connected to a boom 50 and communicatively coupled to a controller area network 49 (e.g., ISO CAN bus) of the overall control system 40. As discussed herein, the CAN bus 49 is configured to provide overall system information from the master node 42 (e.g., master node). The ECU at each smart nozzle 52 uses data from the overall system information to regulate, determine, and/or control the nozzle flow rate of each corresponding smart nozzle 52.

The master node 42 controls a system pressure using, for example, the master PSI transducer 46 and the master pulse width modulation (PWM) valve 48, instead of controlling a system flow rate. Although FIG. 4 illustrates a PWM valve as the master valve 48, embodiments are not so limited. For example, the master valve 48 includes any valve capable of controlling pressure of a system, such as, for example, a ball valve, a PWM valve, or a butterfly valve. For instance, the master node 42 maintains the system pressure at a target system value in contrast to affirmatively controlling the agricultural product flow rate, and the flow rate is controlled at each smart nozzle 52. In another example, the master node controls the system pressure to one or more target values and the smart nozzles 52 control the flow rate at each of the smart nozzles 52 and, therefore, the overall agricultural product flow rate of the system.

In an example, the target system pressure is provided by a user, such as at the User Interface 56 (UI) connected to the master node 42 by the ISO CAN bus 53. In an additional example, the user also provides a target system flow rate (e.g., volume/area) at the UI. In an example, the master node 42 provides the target system flow rate to each of the one or more smart nozzle 52, such that each smart nozzle 52 (or each ECU, as discussed herein) determines an individual agricultural product flow rate for the smart nozzle 52. For example, the system target flow rate is divided by the number of nozzles to provide 52 a target agricultural product flow rate for each of the one or more nozzles 52. In an example, the master node measures the flow rate (e.g., volume per time) with a master flow meter 44 and compares it with the overall target flow rate (e.g., designated by one or more of the user, crop type, soil characteristic, agricultural product type, historical data, or the like). The master node 42 is configured to determine a difference or error, if present, between the measured system flow rate and the target system flow rate. In such an example, the master node 42 provides the determined difference, by the ISO CAN bus 53, to the individual nozzles 52 (or ECUs, as discussed herein). The one or more nozzles 52 receive the difference on the CAN bus 53 and adjust their pressure/flow/duty cycle curve using the difference (e.g., compensating for errors in the system) to reduce the error between the measured and target system flow rates.

Additionally, in at least some examples, the master node 42 reports the actual pressure, measured by the master PSI transducer 46, as well as boom 50 information, including, but not limited to, one or more of yaw rate, speed, number of smart nozzles of the boom, distance between smart nozzles on the boom, to the smart nozzles 52 (or ECUs, as described herein) for individual flow rate control of each of the smart nozzles 52. For example, the information provided from the master node 42 is used in addition to nozzle characteristics to control the individual flow rate control of each smart nozzle 52. Nozzle characteristics include, but are not limited to nozzle position on a boom, length of the boom, nozzle spacing, target flow rate for the system, yaw rate of the boom, yaw rate of the agricultural sprayer, speed of the agricultural sprayer, the overall system pressure, agricultural product characteristics. The system 40 is configured to be installed on an agricultural sprayer, and as such, since the sprayer moves during operation (translates and rotates), the one or more nozzle characteristics, in an example, are dynamic and accordingly changes the individual flow rate.

FIG. 5 illustrates a detailed schematic view of an exemplary nozzle control system 60. The control system 60 includes a master node 62 communicatively coupled to one or more valves of the boom 70, such that system pressure within the boom can be controlled by the master node 62. Further, the master node 62 includes inputs from a master flowmeter 64, a master pressure transducer 66, and a master pulse width modulation (PWM) valve 68. Further, as described herein, the master node is coupled to a UI 76 and, in an example, a battery 78, so as to provide power to one or more of the master node 62 and UI 76.

As shown in the embodiment of FIG. 5, a smart nozzle includes an ECU 72 coupled to a PWM valve 73. That is, FIG. 5 illustrates 36 ECUs relating directly to 36 nozzles of the nozzle control system 60, but embodiments are not so limited. A master node 62 is communicatively coupled, by ISO CAN bus 69 to ECU-18 and ECU-19, wherein ECU-18 72 and ECU-19 72 define a center region of the boom. From the center region of the boom, the ECUs 72 are communicatively coupled to the most proximate ECU 72 in the direction toward each terminal end 74 of the boom. That is, ECU-18 is communicatively couple to ECU-17, which is communicatively coupled to ECU-16, and so forth until the terminator after ECU-1 is reached. The same pattern holds for the other half of the boom. Although 36 ECUs 72 are illustrated, embodiments are not so limited. Further, as shown in FIG. 5, each ECU 72 is coupled to one PWM valve 73, however, embodiments are not so limited. For example, a single ECU 72 is communicatively coupled to more than one PWM valve 73. Said another way, a single ECU 72, in an example, is communicatively coupled to more than one nozzle, such as, for example, every other nozzle. In an example, 12 ECUs split control of the 36 nozzles of the boom. In an example, a plurality of nozzles are partitioned into nozzle groups, such that each nozzle group includes an ECU 72 configured to control a nozzle group flow rate of the agricultural product dispensed from each nozzle of the nozzle group based on the nozzle characteristics, as described herein, of the respective nozzles. Benefits of such embodiments include reducing costs. Thus, a smart nozzle is a single nozzle and an associated ECU or is a group of nozzles associated with a common ECU.

In still another example, the system 60 includes one or more location fiducials associated with the system 60, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 72 of the system is configured to control the agricultural product at individual rates according to the location the one or more nozzles (or ECUs 72) of the plurality of nozzles on the field map (and optionally in addition to the nozzle characteristics described herein). Further, the each of the plurality of nozzles (or ECUs 72) can be cycled, such as on/off, according to the nozzle's (or nozzle group's or ECU's 72) location on the field. This is in contrast to previous approaches which required all the nozzles of a section of the boom to be shut off or turned on at the same time.

In an example, each nozzle ECU 72 is programmable to receive, track, or manipulate designated nozzle control factors. For example, each ECU 72 focuses on nozzle spacing, target flow rate for the system, and speed of the agricultural sprayer while ignoring yaw rate, nozzle location on the field, etc. Such examples provide the benefit of simplifying the system to user specifications, provide greater programmability of the system, and providing cost effective nozzle specific flow rate solutions. In yet another example, the ECUs 72 associated with each nozzle are instead consolidated into one or more centralized nodes that determine the individual flow rates of each of the respective nozzles in a similar manner to the previously described ECUs 72 associated with each of the nozzles.

Figure 6:
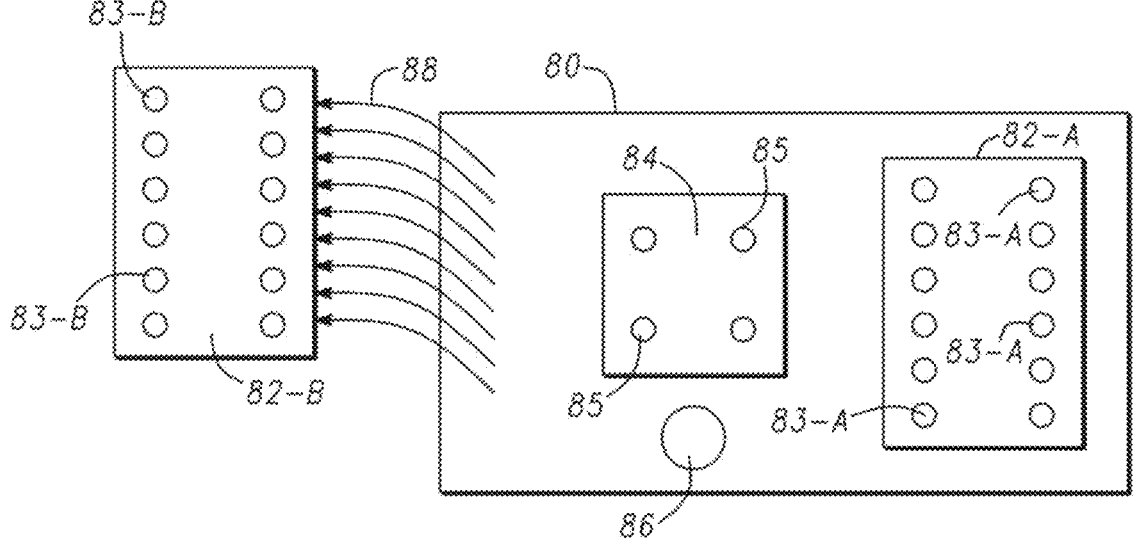
FIG. 6 is an exemplary schematic view of a nozzle ECU.

FIG. 6 is an exemplary schematic view of an ECU 80. The ECU 80 includes two connectors, including a 4-pin thermistor 84 and a 12-pin connector 82-A, and an LED 86. The LED 86, in an example, is indicates the readiness state of the smart nozzle. In an example, the LED 86 is a multi-color LED, wherein a specific color shown along with a rate at which the LED 86 flashes indicates if the smart nozzle is in an error mode, including what type of error, warning state, ready state, actively controlling state, or the like. The 4-pin thermistor 84 includes, in an example, a number of control aspects, such as, but not limited to, valve and thermistor. The 12-ping connector 82-A includes, in an example, a number of control aspects, such as but not limited to any specific configuration, power, ground, nozzle startup, location recognition. Such pin indexing, in an example, is applicable to a smart nozzle or the ISO CAN bus. The lines with arrows signify 88 a cable to daisy-chain ECU 82-A to a 12-pin connector 82-B including pins 83-B, although embodiments are not so limited. The ECU 80 controls the nozzle flow rate based on a number of parameters, including, but not limited to: speed of the sprayer or boom, yaw rate, target system flow rate (e.g. volume/area), and on/off command at runtime. Such parameters permits the ECU 80 to calibrate the duty cycle curve (e.g., the duty cycle curve provided by a nozzle manufacturer) of each smart nozzle needed to achieve the target nozzle flow rate of each of the smart nozzles. Each smart nozzle is further configured according to nozzle spacing on the boom, location on the boom, and nozzle type. Further, each smart nozzle can regulate or control the nozzle flow rate based on the location of the nozzle in the field (as described above).

In an example, the ECU 80 further includes the thermistor 84 so as to provide temperature sensitive control of the nozzle. For example, as power is provided to the thermistor 84, the thermistor 84 heats up, consequently changing the resistivity of the thermistor 84. The agricultural product flows over the thermistor 84, reducing the heat of the thermistor 84 and altering the resistivity of the thermistor 84. In an example, the changes in resistivity of the thermistor 84 are used to indicate or determine that a nozzle is fouled, clogged, or the like. In another example, a pressure sensor or transducer is configured to measure the pressure after each of the PWM valves (e.g., 73, FIG. 5). In an example the pressure transducer is attached to each smart nozzle or plugged as an add-on feature.

In a further example, the overall system data (e.g., actual flow rate compared to targeted flow rate, maintained pressure vs. targeted pressure, etc.) is used to calibrate one or more thermistors. The calibrated thermistor 84 of the smart nozzle is then used to further calibrate the duty cycle curve of the corresponding smart nozzle. Benefits of such examples, provide a more accurate, configurable, and efficient smart nozzle for application of an agricultural product.

Figure 7:
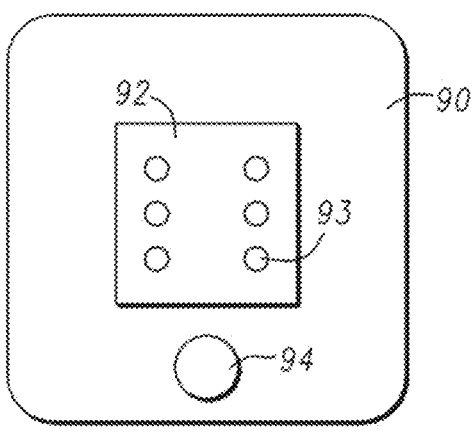
FIG. 7 is an alternative exemplary schematic view of a nozzle ECU.

FIG. 7 illustrates an alternative exemplary view of an ECU 90. The ECU 90 includes a 6-pin 93 connector 92 and an LED 94 on the circuit board. In such an example, each ECU 90 is wired to one another or wired to a centrally located hub. Although nozzle control systems and methods described herein and shown in FIGS. 1 and 2 reference a PWM master valve communicatively coupled to the master node, embodiments are not so limited. For example, other valves are contemplated. Further, examples herein are described in relation to an agricultural sprayer, but other embodiments, such as, but not limited to, planters or toolbars, are contemplated.

Figure 8:
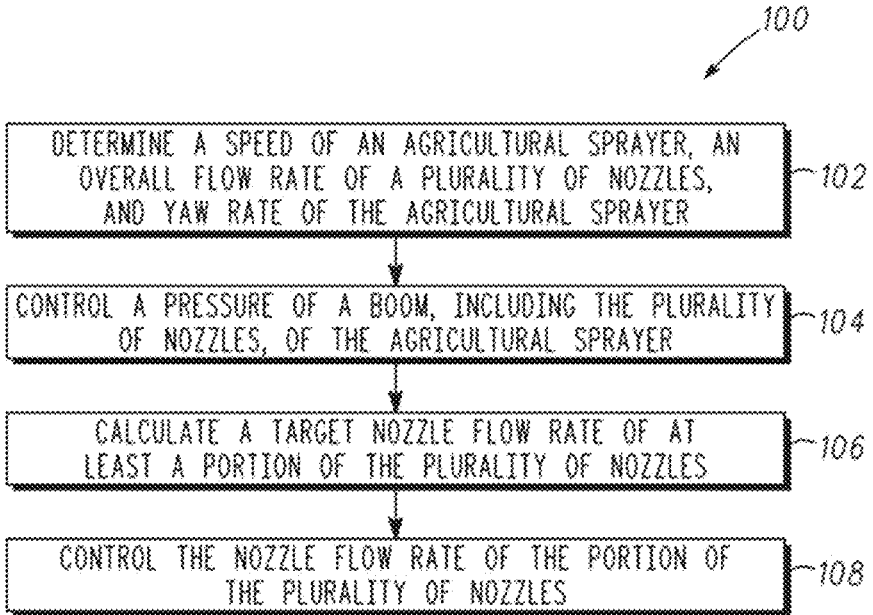
FIG. 8 is a block diagram showing one example of a method for controlling nozzle flow rate on an agricultural sprayer.

FIG. 8 is a block diagram showing one example of a method 100 for controlling nozzle flow rate on an agricultural sprayer having a boom with a plurality of nozzles. In describing the method 100, reference is made to features and elements previously described herein, although not numbered. At 102, the method 100 includes determining a speed of an agricultural sprayer, an overall flow rate of a plurality of nozzles, and yaw rate of the agricultural sprayer. In an example, the speed of the agricultural sprayer is determined by a GPS module, an accelerometer, a speedometer, tachometer, or the like. In an example, the overall flow rate of the plurality of nozzles is determined by a sum of the individual flow rates of each of the plurality of nozzles or is measured by a flow meter. In an example, the yaw rate is determined by a yaw sensor coupled to the boom, master node, or agricultural sprayer to detect a yaw of the hull and provide a yaw signal. At 104, a pressure of an agricultural product in a boom is controlled by a pressure valve in communication with the master node. At 106, the method 100 includes calculating, using at least one of the speed, the overall flow rate, and the yaw rate, a target nozzle flow rate of at least a portion of the plurality of nozzles. As described herein, at 108 the method 100 includes controlling the nozzle flow rate of the portion of the plurality of nozzles.

In an example, the method includes determining a boom section flow rate, including a portion of the plurality of nozzles, based on at least one of the speed, the overall flow rate, and the yaw rate and controlling the flow rate of the boom section. For example, the boom section corresponds to a nozzle group, as described herein, such as a plurality of nozzles controlled by a common ECU. As described herein, controlling includes controlling each of the nozzles of the plurality of nozzles to dispense the agricultural product at individual rates according to the location the one or more nozzles of the plurality of nozzles on a field map. Further, the current method 100 includes controlling the pressure of the boom is independent of controlling the nozzle flow rate of the portion of the plurality of nozzles.

Another example embodiment will now be described. In this embodiment, the master node handles a number of functions in the system. It communicates with the pump and a pressure sensor in order to regulate pressure in the system to a desired target pressure. It also communicates with a flow sensor to obtain an actual overall flow rate. The master node further receives vehicle speed data from a GPS system, yaw rate from a yaw sensor and a target volume/area of an agriculture product (typically input by a user).

The master node also provides error correction for the system by looping through each smart nozzle and calculating each smart nozzle's flow rate. The master node determines this flow rate based on vehicle speed, yaw rate, the location of the nozzle on the boom and the target volume per area. The master node then sums the flow rates and compares this sum to the actual overall system flow rate to determine an error percentage. The error percentage is then provided on the CAN bus for the smart nozzles to change their flow rate.

The master node also checks for saturation points in the flow range for the smart nozzles to make the percent error more accurate. For example, if the master node calculates a flow rate for a smart nozzle that exceeds the nozzle's maximum flow rate, then the master node uses the maximum nozzle flow rate rather than the calculated nozzle flow rate when summing the rates to determine an overall flow rate. The master node in this embodiment does not control the flow rates of the smart nozzles themselves.

Each smart nozzle independently calculates and controls its own flow rate based on CAN bus data from the master node. In an example, each nozzle performs its own flow rate calculation independent from the other nozzles. In particular, the master node transmits vehicle speed, yaw rate, boom width, location of each nozzle on the boom, target volume per area for the applied product, and the error correction. Using this data provided on the CAN bus, each smart nozzle determines its own flow rate, adjusted for the error correction determined by the master node.

The flow rate for a smart nozzle is obtained by multiplying various inputs together (e.g., speed, yaw rate, volume/area). The system (e.g., the master node) can also apply logic (such as if-then statements) to determine whether a smart nozzle should be on or off. For example, if there is an error or the master switch is off, the target rate may not be applied to the smart nozzle and the smart nozzle may be shut off.

NOTES AND EXAMPLES

Example 1 can include subject matter (such as an apparatus, a method, a means for performing acts, or a machine readable medium including instructions that, when performed by the machine, that can cause the machine to perform acts), such as a method of controlling nozzle flow rate of an agricultural product on an agricultural sprayer having a plurality of smart nozzles each associated with an electronic control unit (ECU) and one or more individual nozzles, comprising: determining a speed of the agricultural sprayer, an overall target flow rate of the plurality of smart nozzles, and a yaw rate of the agricultural sprayer; controlling a pressure of the agricultural product of the agricultural sprayer using a master node; determining a target nozzle flow rate for each smart nozzle using at least one of the speed, the overall target flow rate, and the yaw rate; and controlling with each respective smart nozzle, the nozzle flow rate of the associated one or more individual nozzles based on the target nozzle flow rate for the respective smart nozzle.

Example 2 can include, or can optionally be combined with the subject matter of Example 1 to optionally include wherein determining the target nozzle flow rate for each smart nozzle includes determining at each of the smart nozzles the target nozzle flow rate for the respective smart nozzle.

Example 3 can include, or can optionally be combined with the subject matter of one or any combination of Examples 1 or 2 to optionally include further comprising: calculating a boom section flow rate, the boom section including a portion of the plurality of smart nozzles, based on at least one of the speed, the overall target flow rate, and the yaw rate; and controlling the boom section flow rate.

Example 4 can include, or can optionally be combined with the subject matter of one or any combination of Examples 1-3 to optionally include further comprising controlling the nozzle flow rate of each of the smart nozzles to dispense the agricultural product at individual rates according to the location of each of the smart nozzles or individual nozzles on a field map.

Example 5 can include, or can optionally be combined with the subject matter of one or any combination of Examples 1-4 to optionally include wherein controlling the pressure of the agricultural product is performed independent of controlling the target nozzle flow rate for each of the smart nozzles.

Example 6 can include, or can optionally be combined with the subject matter of one or any combination of Examples 1-5 to optionally include wherein controlling the nozzle flow rate includes determining an on/off state of one or more of the plurality of smart nozzles.

Example 7 can include, or can optionally be combined with the subject matter of one or any combination of Examples 1-6 to optionally include further comprising calculating an error with the master node, including: determining the nozzle flow rate of each of the smart nozzles based on the speed, the yaw rate, the location of the smart nozzle on the boom, and the target overall target flow rate of each of the smart nozzles; summing the nozzle flow rate of each of the smart nozzles; comparing the sum to an actual overall system flow rate to provide an error percentage; and providing the error percentage to each of the smart nozzles.

Example 8 can include subject matter (such as an apparatus, a method, a means for performing acts, or a machine readable medium including instructions that, when performed by the machine, that can cause the machine to perform acts), such as a system for controlling nozzle flow rate, comprising: an overall system pressure valve, configured to adjust the pressure of an agricultural product within a boom; a master node configured to receive an overall system flow rate measurement, an overall target flow rate, and an overall system pressure measurement, the master node configured to adjust the overall system pressure valve to control the pressure of the agricultural product; and a plurality of smart nozzles configured to dispense the agricultural product, the plurality of smart nozzles each associated with an electronic control unit (ECU) and one or more individual nozzle, the smart nozzle is configured to control a nozzle flow rate of the associated one or more individual nozzles Example 9 can include, or can optionally be combined with the subject matter of Example 8 to optionally include wherein each ECU is configured to receive at least one measurement of the agricultural sprayer from the master node including a speed of the boom, an overall system flow rate, and a yaw rate of the agricultural sprayer.

Example 10 can include, or can optionally be combined with the subject matter of one or any combination of Examples 8 or 9 to optionally include wherein each ECU is configured to calibrate a duty cycle curve of the respective smart nozzle based on an actual smart nozzle performance.

Example 11 can include, or can optionally be combined with the subject matter of one or any combination of Examples 8-10 to optionally include wherein each ECU is configured to adjust the smart nozzle flow rate of the agricultural product dispensed at each associated individual nozzle according to a difference between the overall target flow rate and the overall system flow rate measurement.

Example 12 can include, or can optionally be combined with the subject matter of one or any combination of Examples 8-11 to optionally include further comprising a master flow meter to provide the overall system flow rate measurement.

Example 13 can include, or can optionally be combined with the subject matter of one or any combination of Examples 8-12 to optionally include wherein the overall system flow rate measurement is determined at the master node as a sum of each smart nozzle.

Example 14 can include, or can optionally be combined with the subject matter of one or any combination of Examples 8-13 to optionally include further comprising a locating module including one or more location fiducials associated with the system, the one or more location fiducials configured to mark the location of one or more of the plurality smart nozzles on a field map.

Example 15 can include, or can optionally be combined with the subject matter of one or any combination of Examples 8-14 to optionally include wherein in the flow rate of the agricultural product dispensed from the plurality smart nozzles is controlled according to the one or more location fiducials.

Example 16 can include subject matter (such as an apparatus, a method, a means for performing acts, or a machine readable medium including instructions that, when performed by the machine, that can cause the machine to perform acts), such as a system for controlling nozzle flow rate of an agricultural product on an agricultural sprayer having a plurality of smart nozzles each associated with an electronic control unit (ECU) and one or more individual nozzles, comprising: an overall system pressure valve, configured to adjust the pressure of the agricultural product within the agricultural sprayer; and a master node configured to receive an overall system flow rate measurement and an overall system pressure measurement, the master node configured to adjust the overall system pressure valve to control the pressure of the agricultural product, wherein each of the plurality of smart nozzles is configured to dispense the agricultural product from the one or more associated individual nozzles at an individual rate based on nozzle characteristics of the one or more associated individual nozzles Example 17 can include, or can optionally be combined with the subject matter of Example 16 to optionally include wherein the nozzle characteristics vary with one or more of a smart nozzle or an individual nozzle position on a boom, length of the boom, an individual or smart nozzle spacing, yaw rate of the boom, target flow rate for the system, yaw rate of the agricultural sprayer, speed of the agricultural sprayer, the overall system pressure, agricultural product characteristics.

Example 18 can include, or can optionally be combined with the subject matter of one or any combination of Examples 16 or 17 to optionally include comprising one or more location fiducials associated with the system, the one or more location fiducials configured to mark the location of one or more smart nozzles of the plurality of smart nozzles on a field map.

Example 19 can include, or can optionally be combined with the subject matter of one or any combination of Examples 16-18 to optionally include wherein each of the smart nozzles is configured to dispense the agricultural product at individual rates according to the location the one or more smart nozzles of the plurality of nozzles on the field map.

Example 20 can include, or can optionally be combined with the subject matter of one or any combination of Examples 16-19 to optionally include wherein the ECU is configured to control a collective nozzle flow rate of the smart nozzles based on the nozzle characteristics of the associated nozzles.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An agricultural sprayer control system, comprising:
a system pressure element configured to control a system pressure of agricultural product in the agricultural sprayer control system;
a processor in communication with the system pressure element, the processor is configured to control actuation of the system pressure element to automatically control the system pressure and spray the agricultural product with an associated specified droplet size from one or more nozzles of one or more smart nozzles; and the one or more smart nozzles, each of the one or more smart nozzles includes:

a control valve;

at least one nozzle of the one or more nozzles in communication with the control valve, the at least one nozzle configured to apply the agricultural product; and an ECU in communication with the control valve and configured to control actuation of the control valve to automatically control a flow rate of the agricultural product from the at least one nozzle.

2. The agricultural sprayer control system of claim 1, wherein the system pressure element includes a second control valve.

3. The agricultural sprayer control system of claim 2, wherein the control valve includes a pulse width modulation valve.

4. The agricultural sprayer control system of claim 1, wherein the system pressure element includes a pump.

5. The agricultural sprayer control system of claim 1, wherein the processor and the ECU of each of the one or more smart nozzles are configured to simultaneously automatically control the system pressure and the flow rate of the agricultural product from the one or more smart nozzles.

6. The agricultural sprayer control system of claim 1, wherein the processor and the ECU of each of the one or more smart nozzles are configured to coordinate automatic control of the system pressure and the flow rate of the agricultural product from the one or more smart nozzles.

7. The agricultural sprayer control system of claim 1, wherein the processor is configured to automatically control the system pressure within a range of target pressure values.

8. The agricultural sprayer control system of claim 7, wherein the processor is configured to automatically control the system pressure within the range of target pressure values including one or more target pressure values.

9. The agricultural sprayer control system of claim 1, wherein the ECU configured to control actuation of the control valve is configured to automatically control the flow rate of the agricultural product, including a change in the flow rate of the agricultural product, from the at least one nozzle.

10. The agricultural sprayer control system of claim 1, wherein one or more of the ECU configured to control actuation of the control valve or the processor configured to control actuation of the system pressure element are configured to automatically control the flow rate or the system pressure, respectively, based on speed of an agricultural sprayer.

11. The agricultural sprayer control system of claim 1, wherein one or more of the ECU configured to control actuation of the control valve or the processor configured to control actuation of the system pressure element are configured to automatically control the flow rate or the system pressure, respectively, based on agricultural product characteristics of the agricultural product.

12. The agricultural sprayer control system of claim 1 comprising a user interface in communication with one or more of the processor or the ECU, the user interface configured to input one or more of target pressure or target flow rate.

13. A method for controlling an agricultural sprayer comprising:

specifying a target system pressure for an agricultural product;

specifying a target flow rate for the agricultural product at one or more nozzles of a smart nozzle;

automatically controlling system pressure to the target system pressure, automatically controlling the system pressure includes:

actuating a system pressure element according to the target system pressure; and spraying the agricultural product from the one or more nozzles with a specified droplet size associated with the target system pressure; and automatically controlling a flow rate through the one or more nozzles to the target flow rate, automatically controlling the flow rate includes:

actuating a control valve of the smart nozzle according to the target flow rate; and spraying the agricultural product from the one or more nozzles of the smart nozzle at the target flow rate.

14. The method of claim 13, wherein automatically controlling the system pressure and automatically controlling the flow rate are conducted concurrently.

15. The method of claim 13, wherein automatically controlling the system pressure and automatically controlling the flow rate are coordinated to spray the agricultural product from the one or more nozzles with the specified droplet size and at the target flow rate.

16. The method of claim 13, wherein the system pressure element includes one or more of a second control valve, a pulse width modulation valve, or a pump.

17. The method of claim 13, wherein actuating the system pressure element according to the target system pressure includes actuating the system pressure element with a processor.

18. The method of claim 13, wherein actuating the control valve of the smart nozzle includes actuating the control valve with an electronic control unit (ECU) of the smart nozzle.

19. The method of claim 13, wherein automatically controlling the system pressure to the target system pressure includes automatically controlling the system pressure within a range of target pressure valves including one or more target pressure values.

20. The method of claim 13, wherein automatically controlling the flow rate through the one or more nozzles includes changing the flow rate through the one or more nozzles.

21. The method of claim 20, wherein the target flow rate includes a first target flow rate and a second target flow rate; and changing the flow rate through the one or more nozzles includes changing the flow rate from the first target flow rate to the second target flow rate.

22. The method of claim 13, wherein one or more of automatically controlling the system pressure or automatically controlling the flow rate includes one or more of automatically controlling the system pressure or automatically controlling the flow rate according to a speed of the agricultural sprayer.

23. The method of claim 13, wherein one or more of automatically controlling the system pressure or automatically controlling the flow rate includes one or more of automatically controlling the system pressure or automatically controlling the flow rate according to agricultural product characteristics of the agricultural product.

24. The method of claim 13, wherein one or more of specifying the target system pressure for the agricultural product or specifying the target flow rate for the agricultural product includes one or more of inputting the target system pressure or the target flow rate with a user interface.

\* \* \* \* \*